(12) United States Patent
Schmidt

(10) Patent No.: US 11,180,376 B1
(45) Date of Patent: Nov. 23, 2021

(54) SYNTHESIS OF ZEOLITES HAVING THE FERRIERITE STRUCTURE

(71) Applicant: CHEVRON U.S.A. INC., San Ramon, CA (US)

(72) Inventor: Joel Edward Schmidt, Oakland, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 17/206,329

(22) Filed: Mar. 19, 2021

(51) Int. Cl.
*C01B 39/44* (2006.01)

(52) U.S. Cl.
CPC ........ *C01B 39/445* (2013.01); *C01P 2002/72* (2013.01); *C01P 2004/03* (2013.01); *C01P 2006/12* (2013.01); *C01P 2006/14* (2013.01)

(58) Field of Classification Search
CPC .................................................. C01B 39/445
See application file for complete search history.

(56) References Cited

U.S. PATENT DOCUMENTS

| | | |
|---|---|---|
| 3,933,974 A | 1/1976 | Winquist |
| 3,966,883 A | 6/1976 | Vaughan et al. |
| 4,000,248 A | 12/1976 | Martin |
| 4,016,245 A | 4/1977 | Plank et al. |
| 4,017,590 A | 4/1977 | Cormier et al. |
| 4,088,739 A | 5/1978 | Vaughan et al. |
| 4,107,195 A | 8/1978 | Rollmann |
| 4,251,499 A | 2/1981 | Nanne et al. |
| 4,323,481 A | 4/1982 | Kaduk |
| 4,377,502 A | 3/1983 | Klotz |
| 4,578,259 A * | 3/1986 | Morimoto ................ B01J 29/70 423/703 |
| 4,584,286 A | 4/1986 | Valyocsik |
| 4,650,654 A | 3/1987 | Arika et al. |
| 4,687,654 A | 8/1987 | Taramasso et al. |
| 4,795,623 A | 1/1989 | Evans |
| 4,797,266 A * | 1/1989 | Evans ..................... B01J 29/80 423/707 |
| 4,853,203 A * | 8/1989 | Guth ..................... C01B 39/065 423/708 |
| 4,925,548 A | 5/1990 | Rubin |
| 4,942,027 A | 7/1990 | Evans |
| 5,174,980 A | 12/1992 | Hellring et al. |
| 5,190,736 A | 3/1993 | Hellring et al. |
| 5,288,475 A | 2/1994 | Chang et al. |
| 5,985,238 A | 11/1999 | Pasquale et al. |
| 6,136,289 A | 10/2000 | Szabo et al. |
| 9,827,560 B2 | 11/2017 | Petushkov et al. |
| 2005/0133413 A1 * | 6/2005 | Burton .................. C07C 5/2708 208/111.01 |
| 2007/0041898 A1 * | 2/2007 | Zones ..................... B01J 29/74 423/706 |
| 2008/0083657 A1 * | 4/2008 | Zones .................... C10G 45/64 208/134 |
| 2010/0168490 A1 | 7/2010 | Pinar et al. |
| 2015/0375217 A1 * | 12/2015 | Clark .................... C01B 39/445 562/607 |
| 2018/0036722 A1 * | 2/2018 | Clark .................... C07C 51/09 |

FOREIGN PATENT DOCUMENTS

| | | | |
|---|---|---|---|
| CN | 101618884 A * | 1/2010 | |
| EP | 0103981 A1 | 3/1984 | |
| EP | 0055529 B1 | 4/1985 | |

* cited by examiner

*Primary Examiner* — David M Brunsman

(57) ABSTRACT

A zeolite having the ferrierite framework structure is produced using one or more of n-propylamine, n-butylamine, isobutylamine, and n-amylamine as a structure directing agent.

11 Claims, 25 Drawing Sheets

SYNTHESIS OF ZEOLITES HAVING THE FERRIERITE STRUCTURE

FIELD

This disclosure relates to methods for the preparation of zeolites having the FER framework type.

BACKGROUND

Molecular sieve materials are classified by the Structure Commission of the International Zeolite Association according to the rules of the IUPAC Commission on Zeolite Nomenclature. According to this classification, framework type zeolites and other crystalline microporous crystalline materials, for which a structure has been established, are assigned a three-letter code and are described in the "*Atlas of Zeolite Framework Types*" by Ch. Baerlocher, L. B. McCusker and D. H. Olson (Elsevier, Sixth Revised Edition, 2007).

One known molecular sieve for which a structure has been established is the material designated as FER, which is a molecular sieve having a unique two-dimensional 10-/8-membered ring channel system. Examples of FER framework type zeolites include ferrierite, FU-9, ISI-6, NU-23 and ZSM-35. FER framework type zeolites are useful catalyst components for a variety of conversion processes, such as isomerization of olefins.

According to the present disclosure, it has now been found that FER framework type zeolites can be synthesized using one or more of n-propylamine, n-butylamine, isobutylamine, and n-amylamine as a structure directing agent, particularly when an alumina-coated silica is used as a combined source of silicon and aluminum.

SUMMARY

In one aspect there is provided a method of synthesizing a zeolite of FER framework type, the method comprising: (1) forming a reaction mixture comprising: (a) a source of silicon; (b) a source of aluminum; (c) a structure directing agent (Q) comprising n-propylamine, n-butylamine, isobutylamine, n-amylamine, or any combination thereof; (d) a source of an alkali metal (M); (e) a source of hydroxide ions; (f) water; and (g) seeds; and (2) subjecting the reaction mixture to crystallization conditions sufficient to form crystals of the zeolite.

In another aspect, there is provided a zeolite of FER framework type and, in its as-synthesized form, comprising one or more of n-propylamine, n-butylamine, isobutylamine, and n-amylamine in its pores.

DETAILED DESCRIPTION

Definitions

Figure 1:
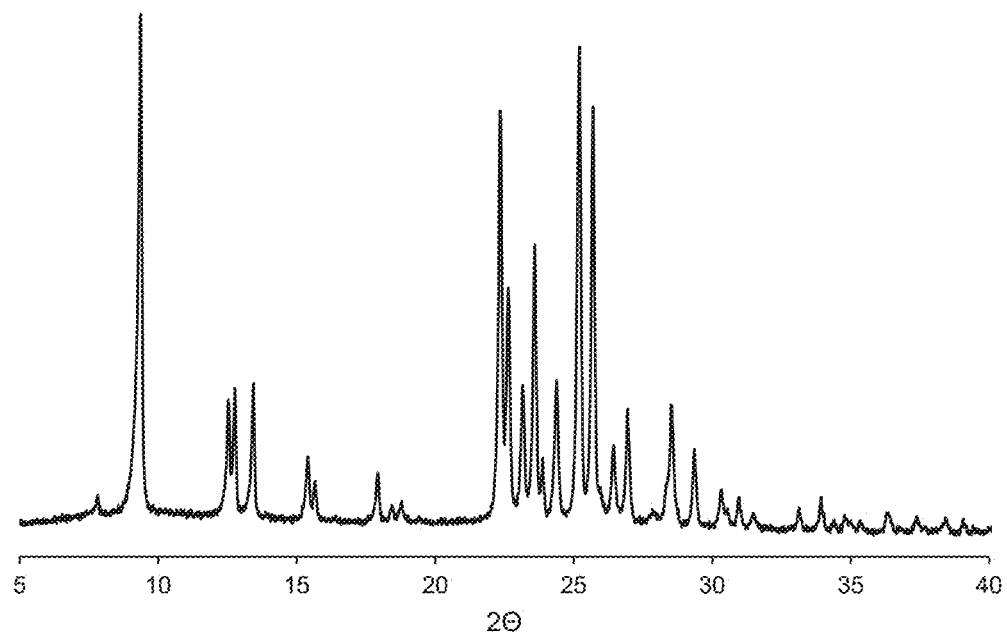
FIG. 1 shows a powder X-ray diffraction (XRD) pattern of the as-synthesized zeolite of Example 1.

The term "framework type" as used herein has the meaning described in the "*Atlas of Zeolite Framework Types*" by Ch. Baerlocher, L. B. McCusker and D. H. Olson (Elsevier, Sixth Revised Edition, 2007).

The term "FER" refers to an FER topological type as recognized by the International Zeolite Association Structure Commission.

The term "as-synthesized" refers to a zeolite in its form after crystallization, prior to removal of the structure directing agent.

The term "$SiO_2/Al_2O_3$ molar ratio" may be abbreviated as "SAR".

Synthesis of the Zeolite

A zeolite of FER framework type can be synthesized by: (1) forming a reaction mixture comprising: (a) a source of silicon; (b) a source of aluminum; (c) a structure directing agent (Q) comprising n-propylamine, n-butylamine, isobutylamine, n-amylamine, or any combination thereof; (d) a source of an alkali metal (M); (e) a source of hydroxide ions; (f) water; and (g) seeds; and (2) subjecting the reaction mixture to crystallization conditions sufficient to form crystals of the zeolite.

The reaction mixture can have a composition, in terms of molar ratios, within the ranges set forth in Table 1:

TABLE 1

|  | Broadest | Secondary |
| --- | --- | --- |
| $SiO_2/Al_2O_3$ | 30 to 200 | 30 to 150 |
| $Q/SiO_2$ | 0.05 to 0.50 | 0.10 to 0.40 |
| $M/SiO_2$ | 0.10 to 1.00 | 0.15 to 0.50 |
| $OH/SiO_2$ | 0.10 to 1.00 | 0.15 to 0.50 |
| $H_2O/SiO_2$ | 10 to 60 | 15 to 50 | wherein Q comprises n-propylamine, n-butylamine, isobutylamine, n-amylamine, or any combination thereof.

Suitable sources of silicon include colloidal silica, precipitated silica, fumed silica, alkali metal silicates, and tetraalkyl orthosilicates.

Suitable sources of aluminum include hydrated alumina, aluminum hydroxide, alkali metal aluminates, aluminum alkoxides, and water-soluble aluminum salts (e.g., aluminum nitrate).

Additionally or alternatively, a combined source of silicon and aluminum may be used. The combined source of silicon and aluminum may be an alumina-coated silica. The alumina-coated silica can have a $SiO_2/Al_2O_3$ molar ratio of at least 30 (e.g., 30 to 170, or 35 to 100). Two or more alumina-coated silica materials having different silica-to-alumina molar ratios may be used. The alumina-coated silica material may be used as the sole or predominant source of silicon and aluminum in the reaction mixture. When present, a separate source of silicon (e.g., colloidal silica) may be included.

The structure directing agent (Q) comprises one or more of n-propylamine [$CH_3(CH_2)_2NH_2$], n-butylamine [$CH_3(CH_2)_3NH_2$], isobutylamine [$(CH_3)_2CHCH_2NH_2$], and n-amylamine [$CH_3(CH_2)_4NH_2$].

The alkali metal (M) is typically introduced into the reaction mixture in conjunction with the source of hydroxide ions. Examples of such metals include sodium and/or potassium, and also lithium, rubidium, and cesium.

The reaction mixture also contains seeds, typically of a FER framework type zeolite, desirably in an amount of from 0.01 to 10,000 ppm by weight (e.g., 100 to 5000 ppm by weight) of the reaction mixture. Seeding can be advantageous to improve selectivity for FER and/or to shorten the crystallization process.

Crystallization of the desired zeolite from the above reaction mixture can be carried out under either static, tumbled or stirred conditions in a suitable reactor vessel, such as for example polypropylene jars or Teflon-lined or stainless-steel autoclaves, at a temperature of from 125° C. to 200° C. (e.g., 140° C. to 185° C.) for a time sufficient for crystallization to occur at the temperature used, e.g., from about 24 hours to 240 hours (e.g., 36 hours to 100 hours). Crystallization is usually conducted under pressure in an autoclave so that the reaction mixture is subject to autogenous pressure.

Once the desired zeolite crystals have formed, the solid product can be separated from the reaction mixture by standard mechanical separation techniques such as centrifugation or filtration. The recovered crystals are water-washed and then dried, for several seconds to a few minutes (e.g., 5 seconds to 10 minutes for flash drying) or several hours (e.g., 4 hours to 24 hours for oven drying at 75° C. to 150° C.), to obtain the as-synthesized zeolite crystals. The drying step can be performed under vacuum or at atmospheric pressure.

As a result of the crystallization process, the recovered crystalline zeolite product contains within its pores at least a portion of the structure directing agent used in the synthesis.

The as-synthesized zeolite may be subjected to thermal treatment, ozone treatment, or other treatment to remove part or all of the structure directing agent used in its synthesis. Removal of the structure directing agent may be carried out using thermal treatment (e.g., calcination) in which the as-synthesized material is heated in an atmosphere selected from air, nitrogen, or a mixture thereof at a temperature sufficient to remove part or all of the structure directing agent. While sub-atmospheric pressure may be used for the thermal treatment, atmospheric pressure is desired for reasons of convenience. The thermal treatment may be performed at a temperature at least 370° C. (e.g., 400° C. to 700° C.) for at least a minute and generally not longer than 20 hours (e.g., 1 to 8 hours).

The FER framework type zeolite may include one or more non-framework alkali metals. Usually, it is desirable to remove the alkali metal cation by ion exchange and replace it with hydrogen, ammonium, or any desired metal ion. Accordingly, the zeolite may be a Na-form zeolite, a K-form zeolite, or a combined Na-, K-form and the like, or may be an H-form zeolite, an ammonium-form zeolite, or a metal-exchanged zeolite. Typical ion exchange techniques involve contacting the synthetic zeolite with a solution containing a salt of the desired replacing cation or cations. Representative ion exchange techniques are widely known in the art. Ion exchange occurs post-synthesis and can take place either before or after the zeolite is calcined. Following contact with the salt solution of the desired replacing cation, the zeolite is typically washed with water and dried at temperatures ranging from 65° C. to 315° C. (e.g., 80° C. to 150° C.).

Characterization of the Zeolite

In its as-synthesized and anhydrous form, the FER framework type zeolite can have a chemical composition, in terms of molar ratios, within the ranges set forth in Table 2:

TABLE 2

|  | Broadest | Secondary |
| --- | --- | --- |
| $SiO_2/Al_2O_3$ | 20 to 100 | 25 to 85 |
| $Q/SiO_2$ | >0 to 0.1 | >0 to 0.1 | wherein Q comprises n-propylamine, n-butylamine, isobutylamine, n-amylamine, or any combination thereof.

The FER framework type zeolites synthesized as described herein are characterized by their powder XRD pattern. Powder XRD patterns representative of FER framework type zeolites can be referenced the "*Collection of Simulated XRD Powder Patterns for Zeolites*" by M. M. J. Treacy and J. B. Higgins (Elsevier, Fifth Revised Edition, 2007).

The X-ray diffraction data reported herein were collected by standard techniques using copper K-alpha radiation. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

In some aspects, the FER framework type zeolite prepared as described herein can have a total Brønsted acid site density in a range of from 350 µmol $H^+$/g to 500 µmol $H^+$/g (e.g., 375 µmol $H^+$/g to 450 µmol $H^+$/g) of the composition, as determined by n-propylamine temperature-programmed desorption (TPD).

EXAMPLES

The following illustrative examples are intended to be non-limiting.

In the syntheses below for Examples 1-29, the starting materials were charged to a 23 mL Teflon liner. The Teflon liner was then capped and sealed inside a steel Parr autoclave. The autoclave was then heated under tumbling conditions (43 rpm) in a convection oven maintained at 170° C. for 2-3 days. The products were isolated by filtration, washed with copious amounts of deionized water, and finally dried in air at 85° C.

The molar ratios and conditions used for the syntheses of Examples 1-29 below are summarized in Table 3 below.

Example 1

4.42 g of 1 M NaOH was mixed with 2.43 g of deionized water and 4.00 g of Nalco alumina-coated silica DVSZN007 (SAR=35; 24.5% solids). Then, 0.35 g of isobutylamine was added followed by 0.05 g of seeds of zeolite FER.

A powder XRD pattern of the product is shown in FIG. 1 and indicates that the material is a FER framework type zeolite.

Example 2

5.53 g of 1 M NaOH was mixed with 5.00 g of Nalco alumina-coated silica DVSZN007 (SAR=35; 24.5% solids). Then, 0.43 g of isobutylamine was added followed by 0.05 g of seeds of zeolite FER.

The recovered-synthesized material was calcined in air by placing a thin bed in a calcination dish and heated in a muffle furnace from room temperature to 120° C. at a rate of 1° C./minute and held at 120° C. for 2 hours. Then, the temperature was ramped up to 540° C. at a rate of 1° C./minute and held at 540° C. for 5 hours. The temperature was ramped up again at 1° C./minute to 595° C. and held at 595° C. for 5 hours. The material was then allowed to cool to room temperature.

The calcined material was then converted to the ammonium form by heating in a solution of ammonium nitrate (typically 1 g $NH_4NO_3$/1 g zeolite in 10 mL of $H_2O$ at 85° C. for at least 3 hours). The material was then filtered. This was repeated twice for a total of 3 exchanges. At the end the material was washed with deionized water to a conductivity of less than 100 µS/cm dried in air at 85° C.

The acid site density was characterized using n-propylamine temperature-programmed desorption (TPD) and found to be 423 µmol $H^+$/g.

The nitrogen micropore volume was found to be 0.14 $cm^3$/g (t-plot analysis) and the BET surface area was 324 $m^2$/g.

The material had a $SiO_2/Al_2O_3$ molar ratio (SAR) of 30, as determined by Inductively Coupled Plasma-Atomic Emission Spectroscopy (ICP-AES).

Figure 2:
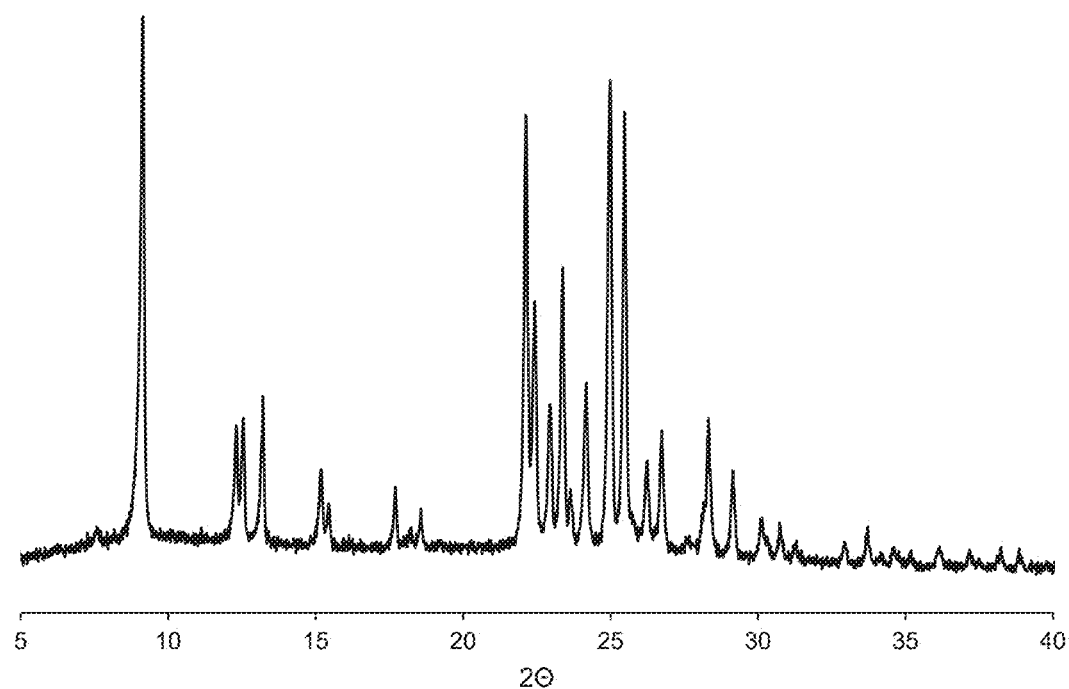
FIG. 2 shows a powder XRD pattern of the ammonium-form zeolite of Example 2.
Figure 3:
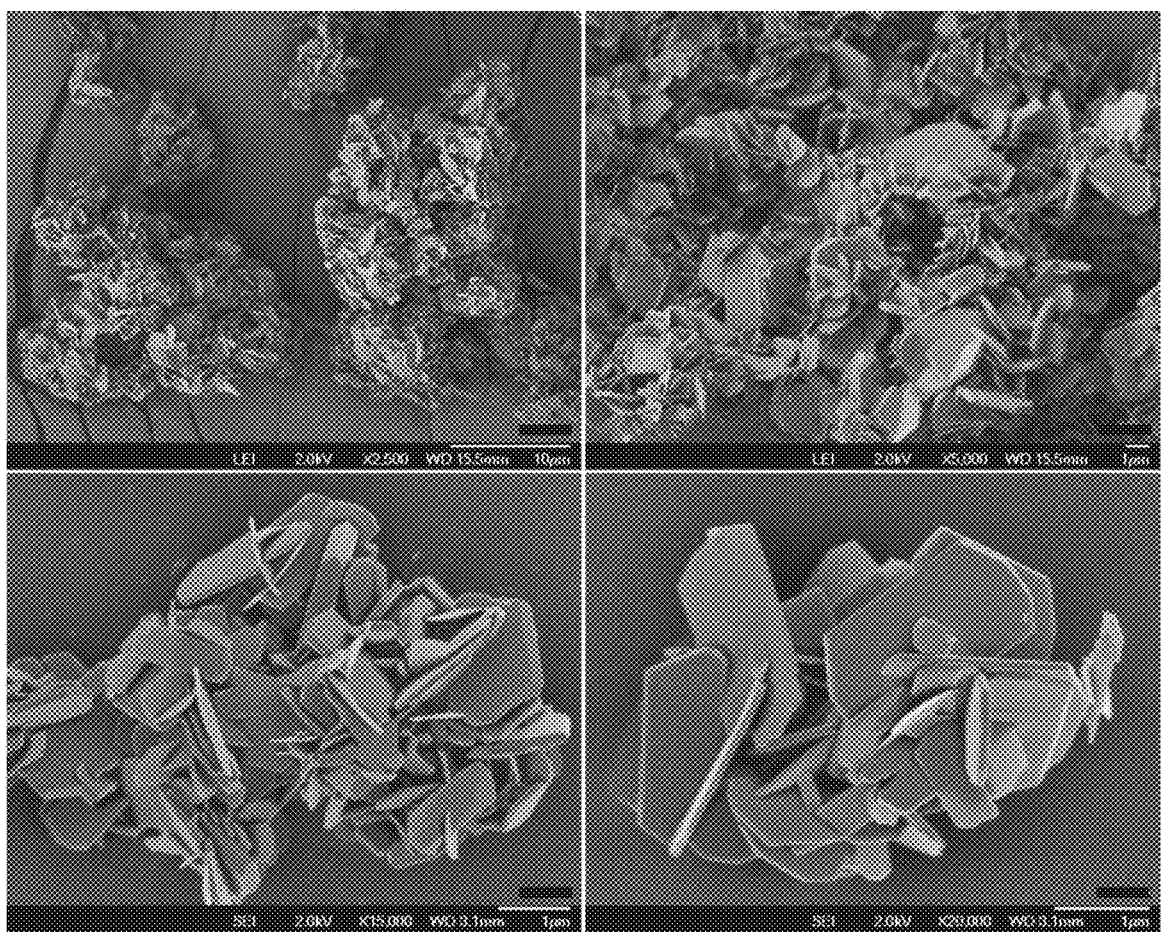
FIG. 3 shows Scanning Electron Micrograph (SEM) images of the ammonium-form zeolite of Example 2 at various magnifications.

The powder XRD pattern of the ammonium form material is shown in FIG. 2 and indicates that the material is a FER framework type zeolite. SEM images of the material at various magnifications are shown in FIG. 3.

Example 3

4.42 g of 1 M KOH was mixed with 2.45 g of deionized water and 4.00 g of Nalco alumina-coated silica DVSZN007 (SAR=35; 24.5% solids). Then, 0.35 g of isobutylamine was added followed by 0.05 g of seeds of zeolite FER.

Figure 4:
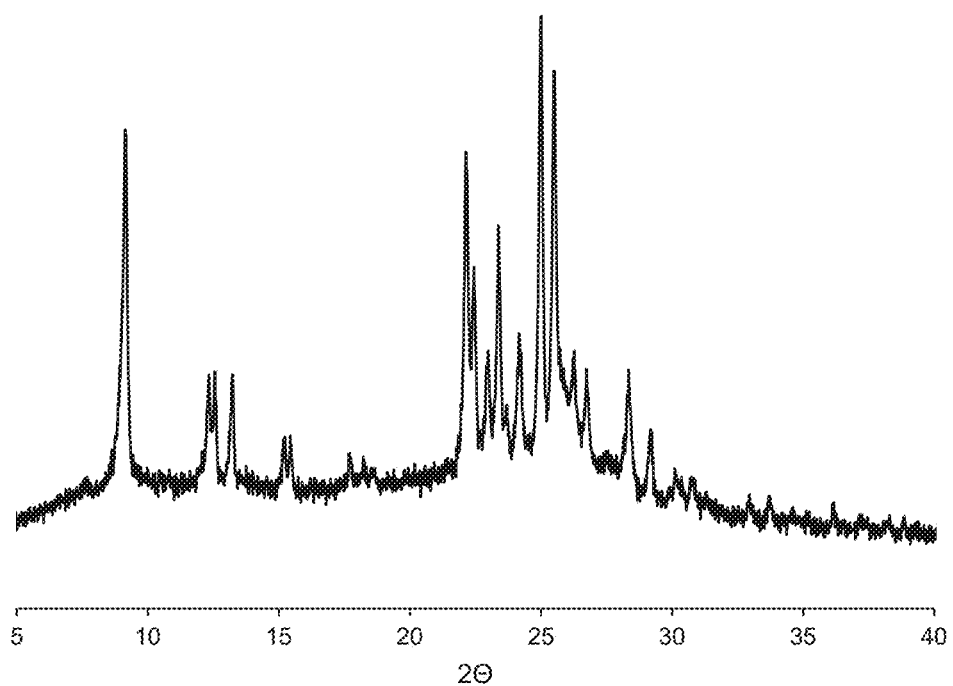
FIG. 4 shows a powder XRD pattern of the as-synthesized zeolite of Example 3.

A powder XRD pattern of the product is shown in FIG. 4 and indicates that the material is a FER framework type zeolite.

Example 4

In a 23 mL Teflon autoclave 5.41 g of 1 M NaOH was mixed with 2.45 g of deionized water and 4.00 g of Nalco alumina-coated silica DVSZN007 (SAR=35; 24.5% solids) and 0.39 g of LUDOX® AS-30 colloidal silica. Then, 0.42 g of isobutylamine was added followed by 0.05 g of seeds of zeolite FER.

Figure 5:
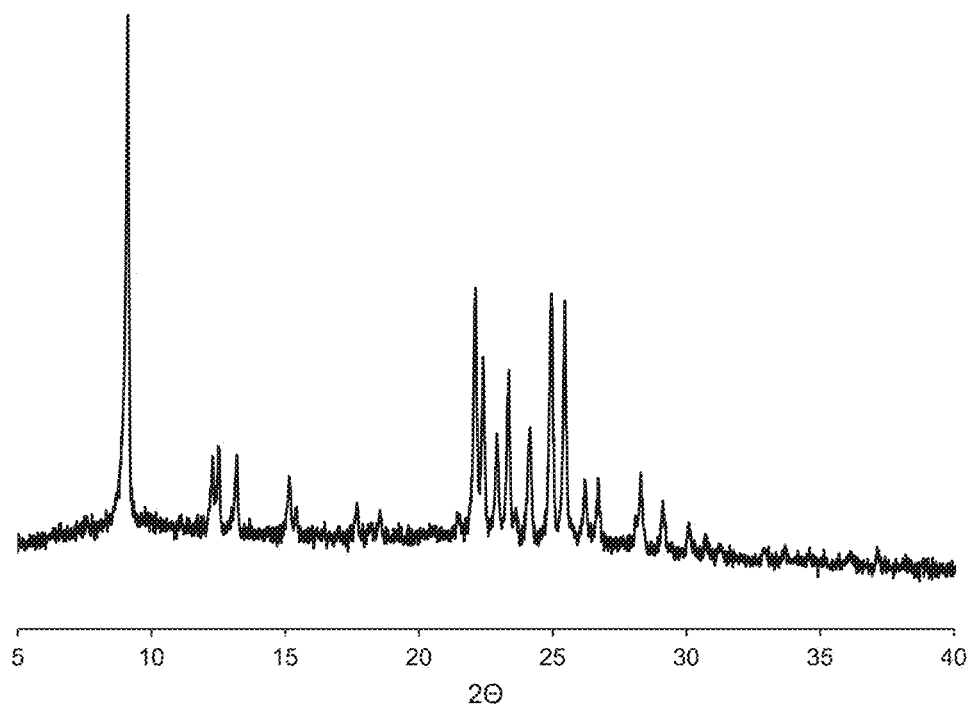
FIG. 5 shows a powder XRD pattern of the as-synthesized zeolite of Example 4.

A powder XRD pattern of the product is shown in FIG. 5 and indicates that the material is a FER framework type zeolite.

Example 5

In a 23 mL Teflon autoclave 5.41 g of 1 M NaOH and 3.15 g of deionized water was mixed with 4.00 g of Nalco alumina-coated silica DVSZN007 (SAR=35; 24.5% solids) and 0.69 g of LUDOX® AS-30 colloidal silica. Then, 0.42 g of isobutylamine was added followed by 0.05 g of seeds of zeolite FER.

Figure 6:
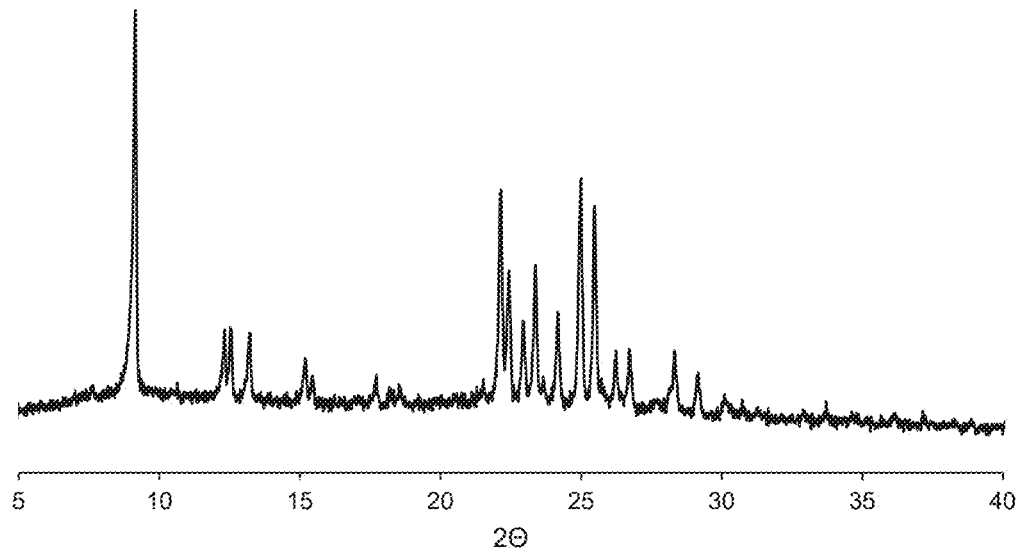
FIG. 6 shows a powder XRD pattern of the as-synthesized zeolite of Example 5.

A powder XRD pattern of the product is shown in FIG. 6 and indicates that the material is a FER framework type zeolite.

Example 6

In a 23 mL Teflon autoclave 4.74 g of 1 M NaOH was mixed with 2.86 g of deionized water and 3.00 g of Nalco alumina-coated silica DVSZN007 (SAR=35; 24.5% solids) and 1.00 g of LUDOX® AS-30. Then, 0.37 g of isobutylamine was added followed by 0.05 g of seeds of zeolite FER.

Figure 7:
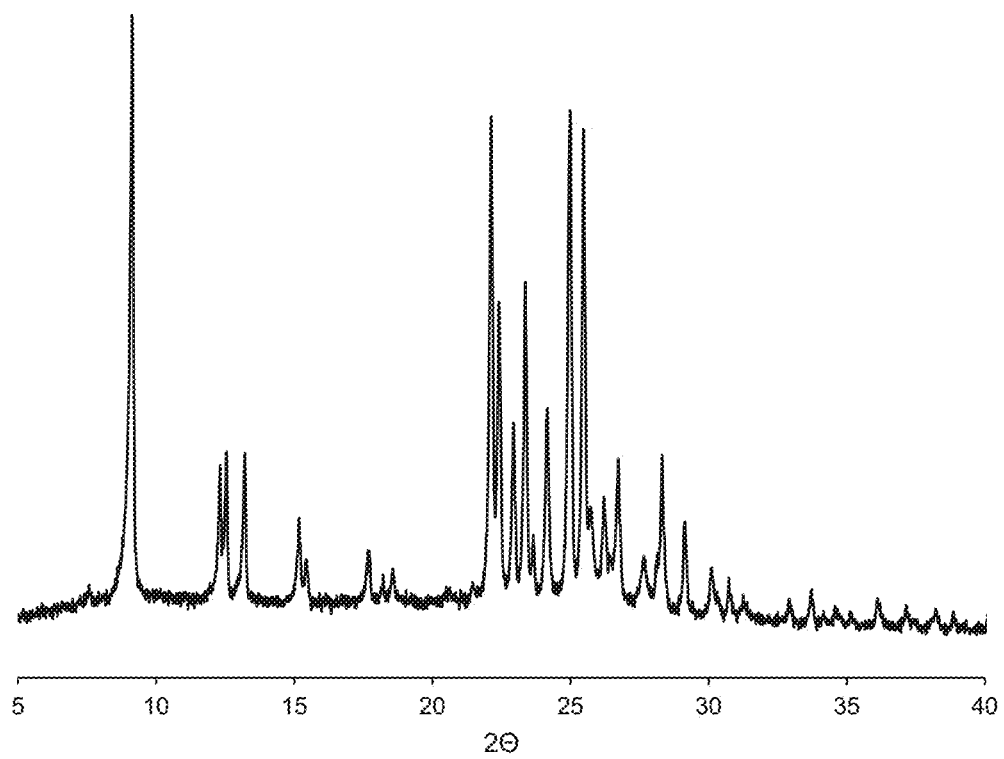
FIG. 7 shows a powder XRD pattern of the as-synthesized zeolite of Example 6.

A powder XRD pattern of the product is shown in FIG. 7 and indicates that the material is a FER framework type zeolite.

Example 7

In a 23 mL Teflon autoclave 4.74 g of 1 M NaOH was mixed with 2.86 g of deioized water and 3.00 g of Nalco alumina-coated silica DVSZN007 (SAR=35; 24.5% solids) and 1.00 g of LUDOX® AS-30 colloidal silica. Then, 0.37 g of isobutylamine was added followed by 0.05 g of seeds of zeolite FER.

The recovered as-synthesized material was calcined and then converted to the ammonium form following the method in Example 2.

The acid site density was characterized using n-propylamine TPD and found to be 421 µmol H$^+$/g.

The nitrogen micropore volume was found to be 0.13 cm$^3$/g (t-plot analysis) and the BET surface area was 285 m$^2$/g.

The material had a $SiO_2/Al_2O_3$ molar ratio (SAR) of 41, as determined by ICP-AES.

Figure 8:
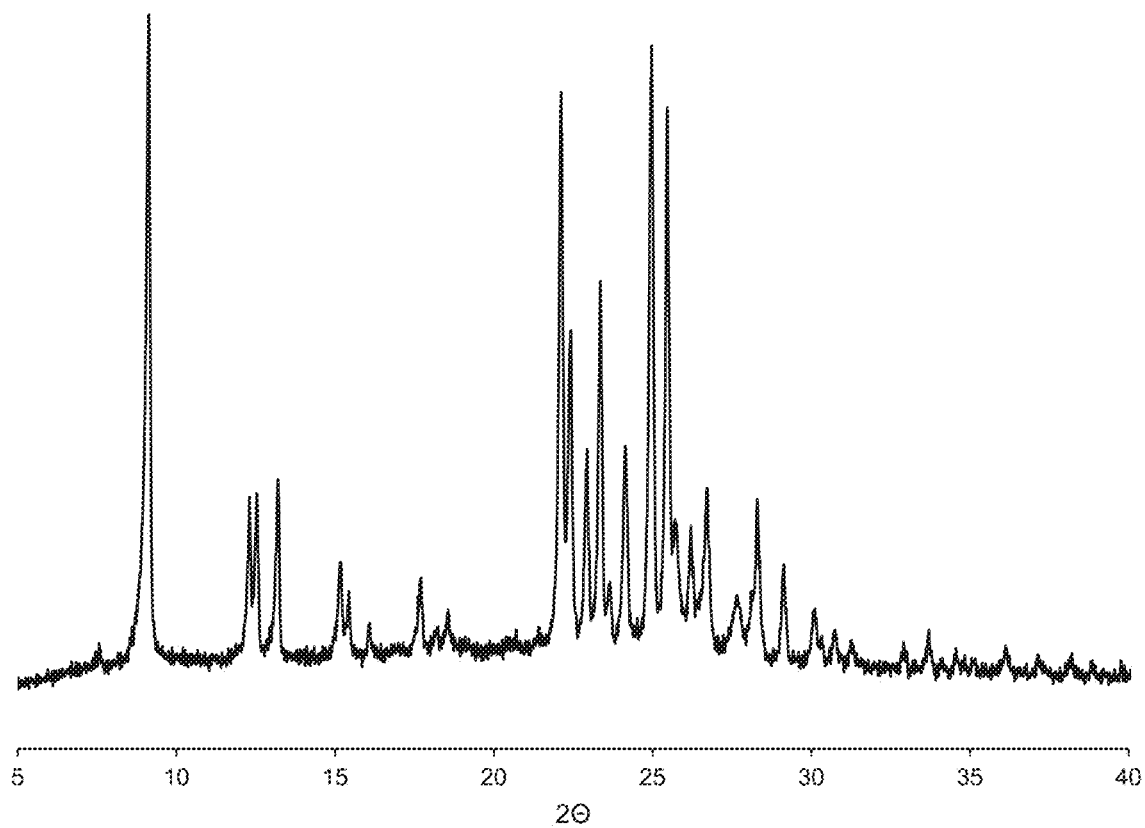
FIG. 8 shows a powder XRD pattern of the ammonium-form zeolite of Example 7.
Figure 9:
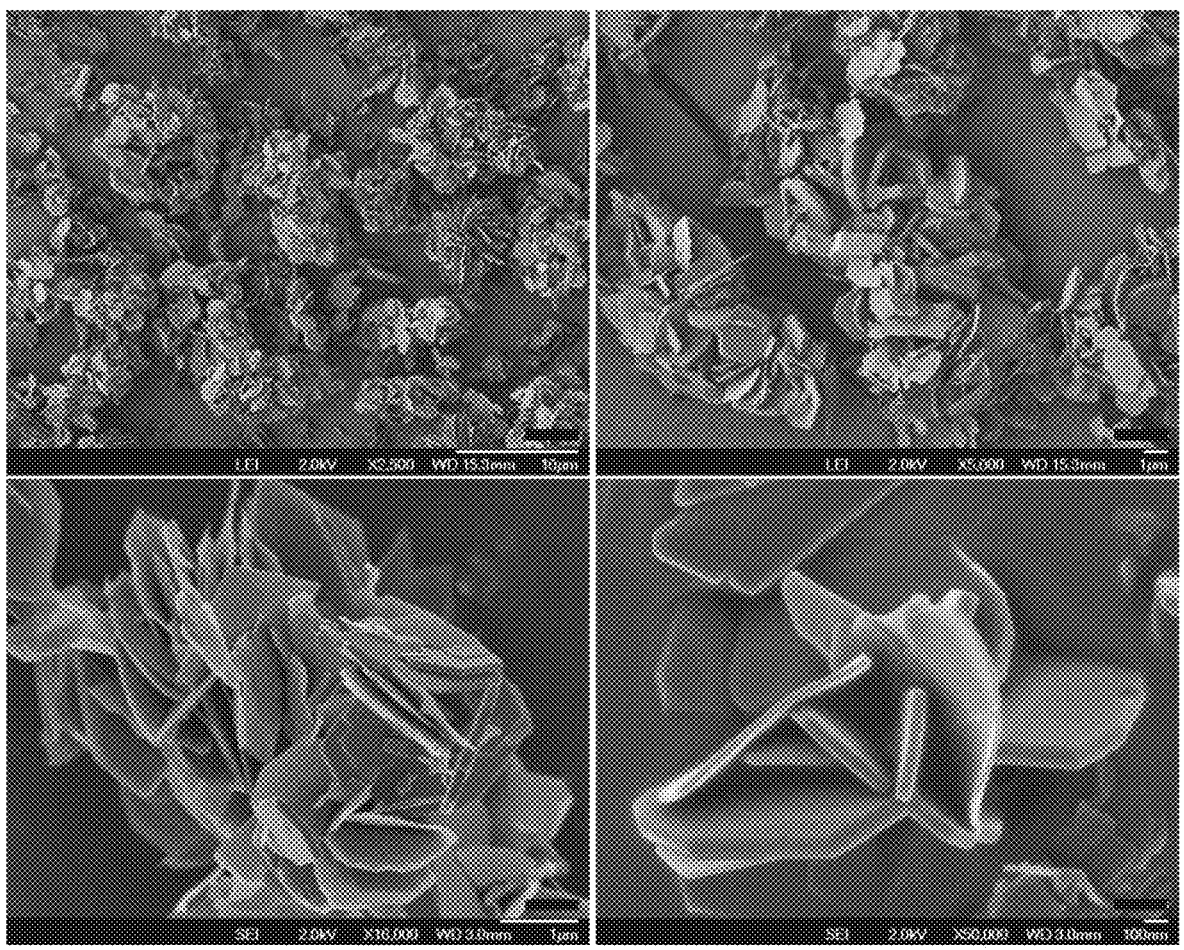
FIG. 9 shows SEM images of the ammonium-form zeolite of Example 7 at various magnifications.

The powder XRD pattern of the ammonium form material is shown in FIG. 8 and indicates that the material is a FER framework type zeolite. SEM images of the material at various magnifications are shown in FIG. 9.

Example 8

4.74 g of 1 M NaOH was mixed with 3.05 g of deionized water and 2.00 g of Nalco alumina-coated silica DVSZN007 (SAR=35; 24.5% solids) and 1.80 g of LUDOX® AS-30 colloidal silica. Then 0.37 g of isobutylamine was added followed by 0.05 g of seeds of zeolite FER.

The recovered as-synthesized material was calcined and then converted to the ammonium form following the method in Example 2.

The acid site density was characterized using n-propylamine TPD and found to be 400 µmol H$^+$/g.

The material had a $SiO_2/Al_2O_3$ molar ratio (SAR) of 57, as determined by ICP-AES.

Figure 10:
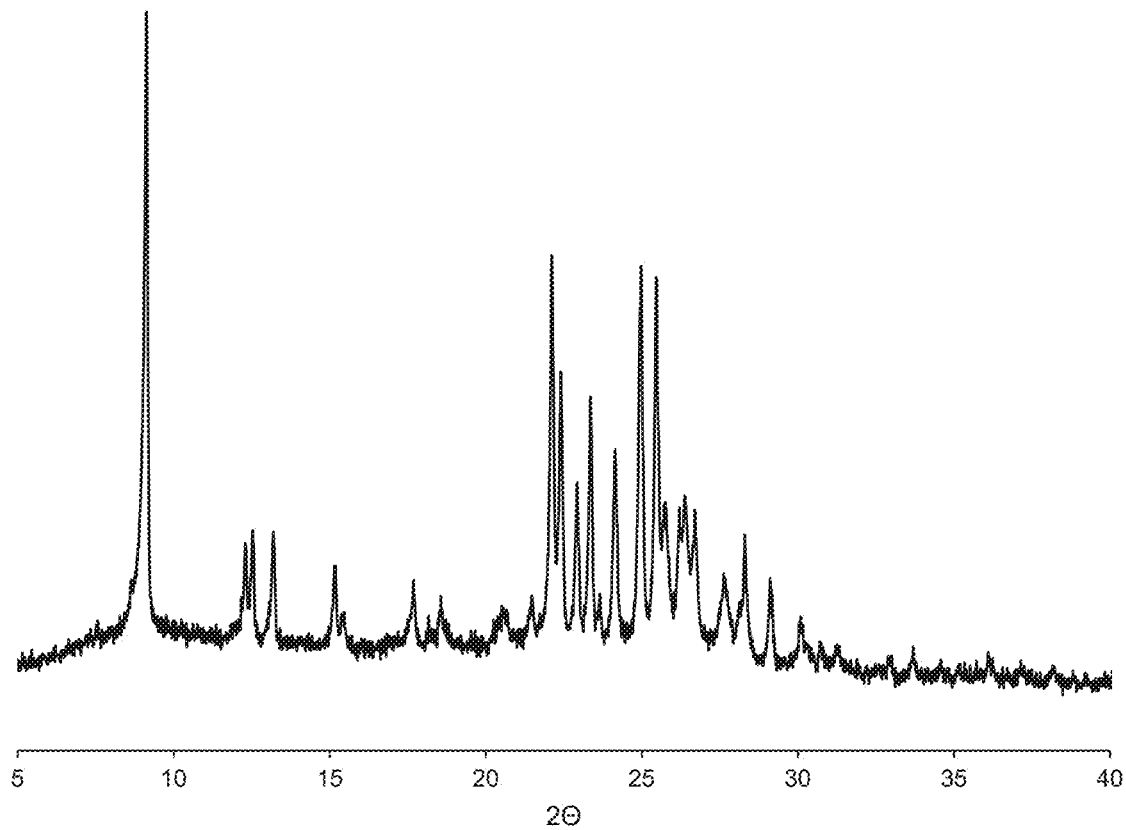
FIG. 10 shows a powder XRD pattern of the ammonium-form zeolite of Example 8.
Figure 11:
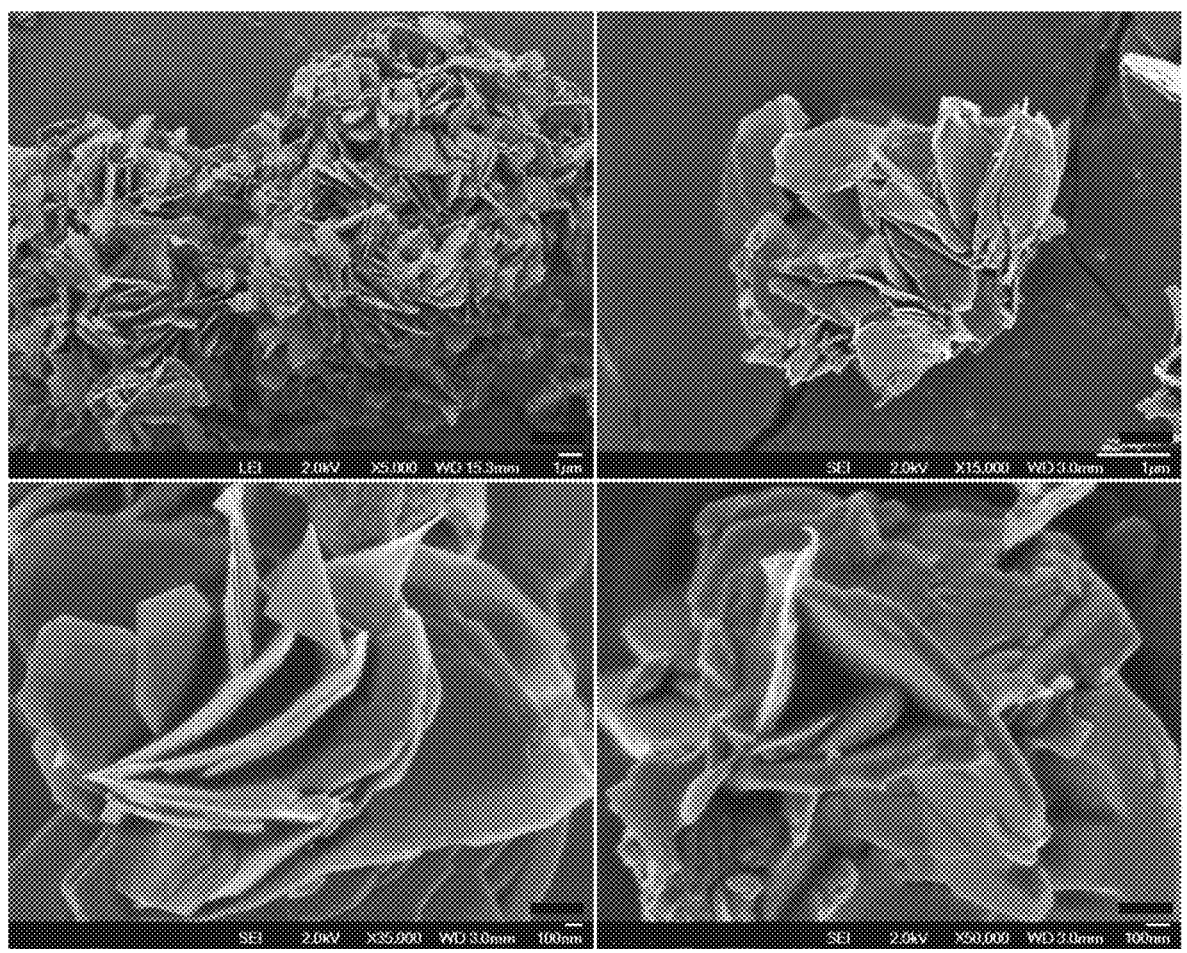
FIG. 11 shows SEM images of the ammonium-form zeolite of Example 8 at various magnifications.

A powder XRD pattern of the ammonium form material is shown in FIG. 10 and indicates that the material is a FER framework type zeolite with minor STI. SEM images of the material at various magnifications are shown in FIG. 11.

Example 9

4.74 g of 1 M NaOH was mixed with 3.14 g of deionized water and 1.50 g of Nalco alumina-coated silica DVSZN007 (SAR=35; 24.5% solids) and 2.20 g of LUDOX® AS-30 colloidal silica. Then, 0.37 g of isobutylamine was added followed by 0.05 g of seeds of zeolite FER.

Figure 12:
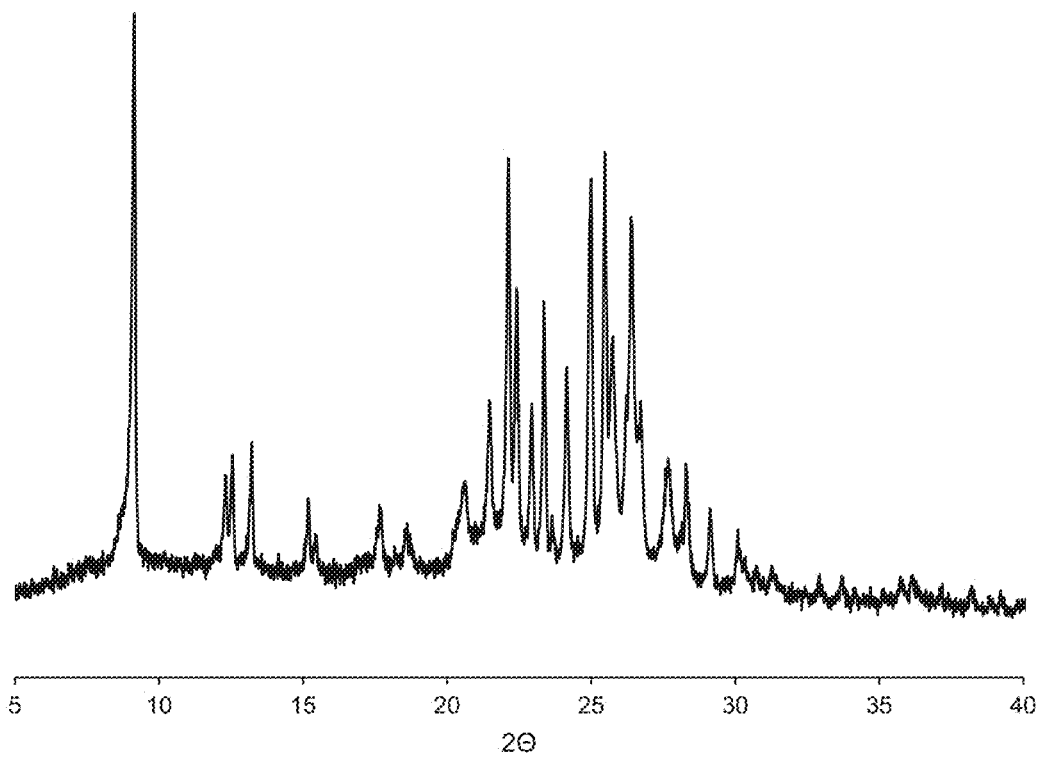
FIG. 12 shows a powder XRD pattern of the as-synthesized zeolite of Example 9.

A powder XRD pattern of the as-synthesized product is shown in FIG. 12 and indicates that the material is a FER framework type zeolite with minor STI.

Example 10

4.74 g of 1 M NaOH was mixed with 3.24 g of DI water and 1.00 g of Nalco alumina-coated silica DVSZN007 (SAR=35; 24.5% solids) and 2.59 g of LUDOX® AS-30 colloidal silica. Then, 0.37 g of isobutylamine was added followed by 0.05 g of seeds of zeolite FER.

Figure 13:
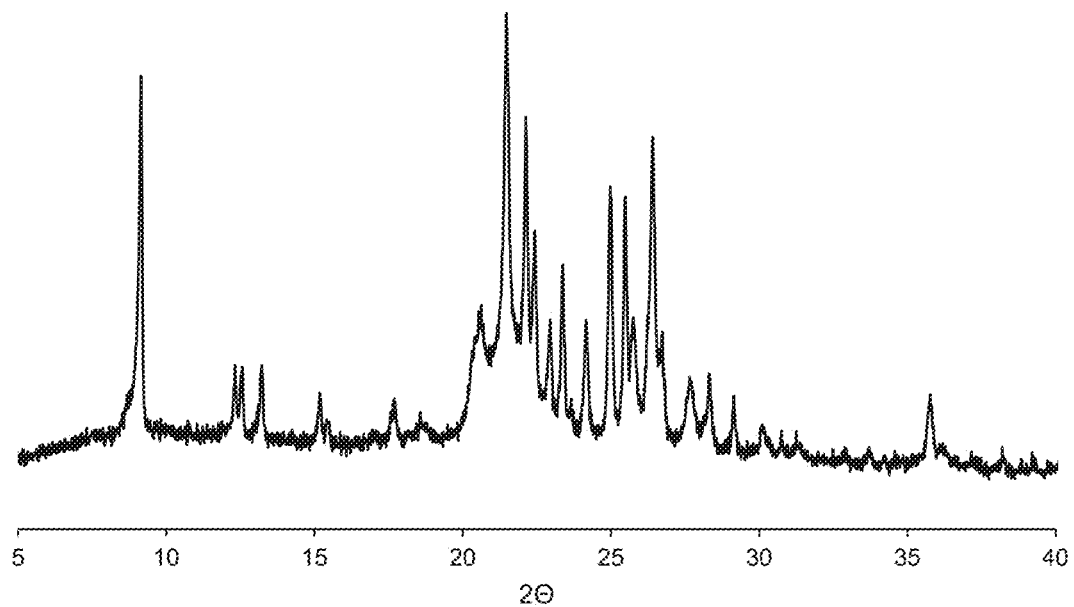
FIG. 13 shows a powder XRD pattern of the as-synthesized zeolite of Example 10.

A powder XRD pattern of the as-synthesized product is shown in FIG. 13 and indicates that the material is a FER framework type zeolite with minor STI.

Example 11

3.71 g of 1 M NaOH was mixed with 2.29 g of deionized water and 3.00 g of Nalco alumina-coated silica DVSZN007 (SAR=100; 26.5% solids). Then, 0.29 g of isobutylamine was added followed by 0.05 g of seeds of zeolite FER.

Figure 14:
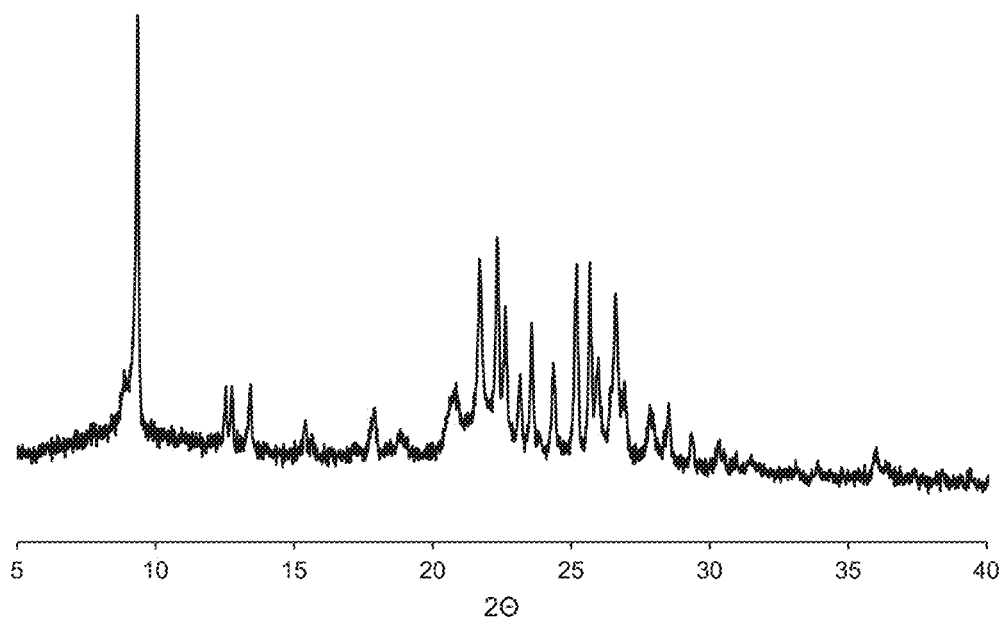
FIG. 14 shows a powder XRD pattern of the as-synthesized zeolite of Example 11.

A powder XRD pattern of the as-synthesized product is shown in FIG. 14 and indicates that the material is a FER framework type zeolite with minor STI.

Example 12

4.63 g of 1 M NaOH was mixed with 2.96 g of deionized water and 3.00 g of Nalco alumina-coated silica DVSZN007 (SAR=100; 26.5% solids) and 0.66 g of LUDOX® AS-30 colloidal silica. Then, 0.36 g of isobutylamine was added followed by 0.05 g of seeds of zeolite FER.

Figure 15:
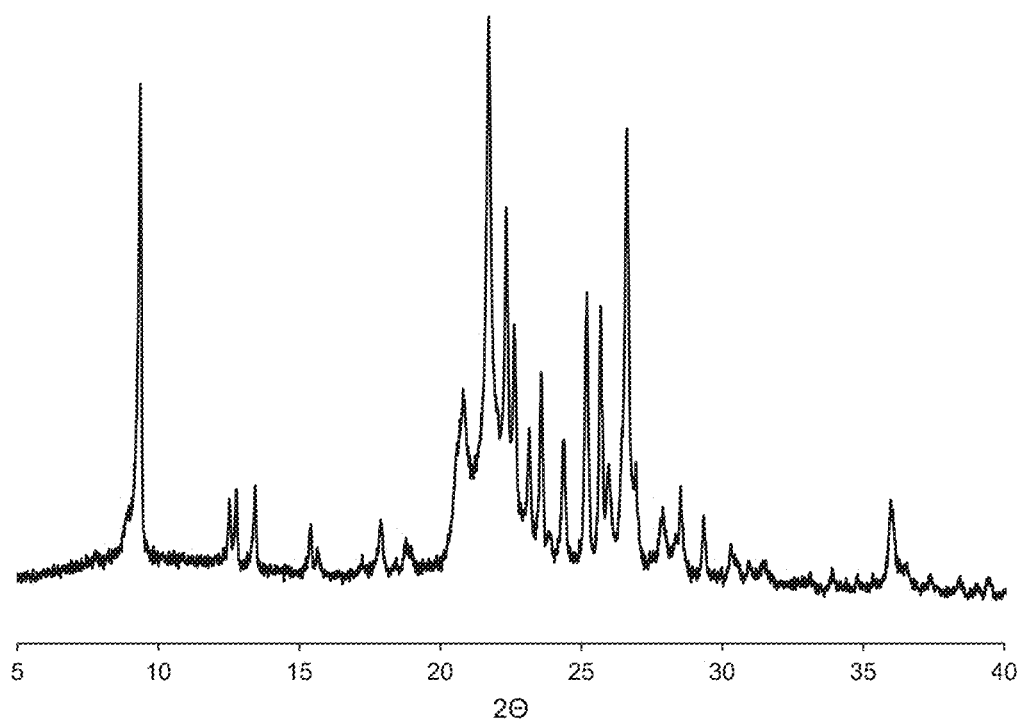
FIG. 15 shows a powder XRD pattern of the as-synthesized zeolite of Example 12.

A powder XRD pattern of the as-synthesized product is shown in FIG. 15 and indicates that the material is a FER framework type zeolite minor STI.

Example 13

3.71 g of 1 M NaOH was mixed with 2.42 g of deionized water and 2.00 g of Nalco alumina-coated silica DVSZN007 (SAR=100; 26.5% solids) and 0.883 g of LUDOX® AS-30 colloidal silica. Then, 0.29 g of isobutylamine was added followed by 0.05 g of seeds of zeolite FER.

Figure 16:
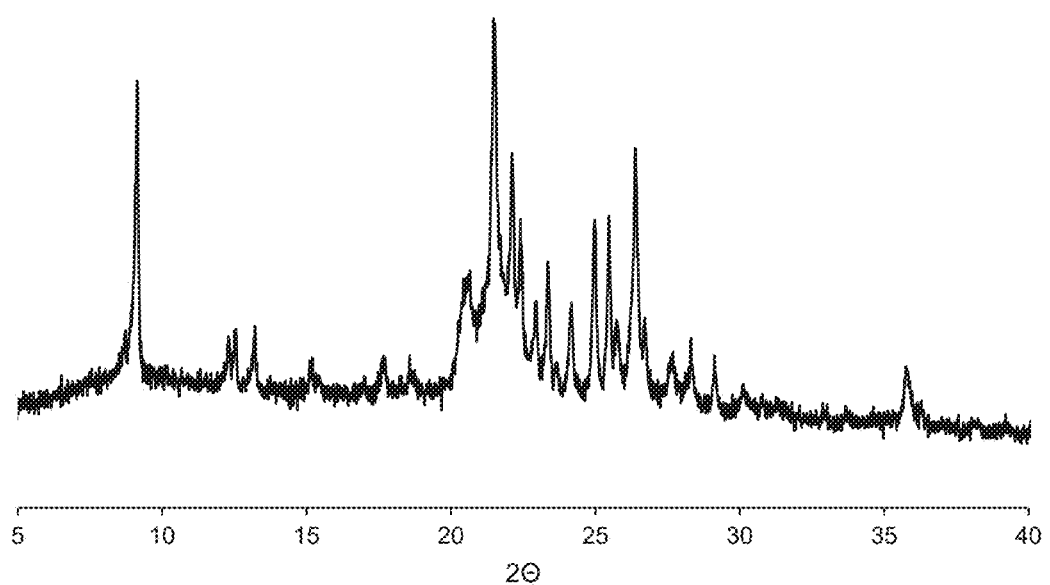
FIG. 16 shows a powder XRD pattern of the as-synthesized zeolite of Example 13.

A powder XRD pattern of the as-synthesized product is shown in FIG. 16 and indicates that the material is a FER framework type zeolite with minor STI.

Example 14

4.32 g of 1 M NaOH was mixed with 2.91 g of deionized water and 1.75 g of Nalco alumina-coated silica DVSZN007 (SAR=100; 26.5% solids). Then, 0.34 g of isobutylamine was added followed by 0.05 g of seeds of zeolite FER.

Figure 17:
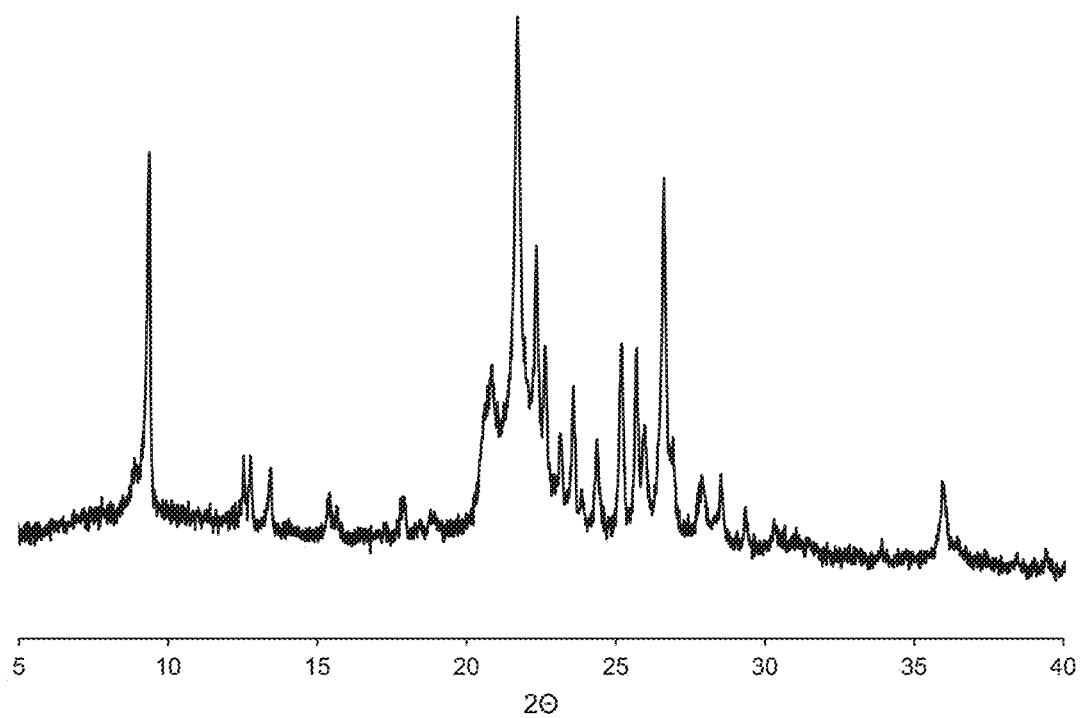
FIG. 17 shows a powder XRD pattern of the as-synthesized zeolite of Example 14.

A powder XRD pattern of the as-synthesized product is shown in FIG. 17 and indicates that the material is a FER framework type zeolite with minor STI.

Example 15

6.32 g of 1 M NaOH was mixed with 0.60 g of deionized water and 2.00 g of Nalco alumina-coated silica DVSZN007 (SAR=35; 24.5% solids) and 2.93 g of LUDOX® AS-30 colloidal silica. Then, 0.50 g of isobutylamine was added followed by 0.05 g of seeds of zeolite FER.

Figure 18:
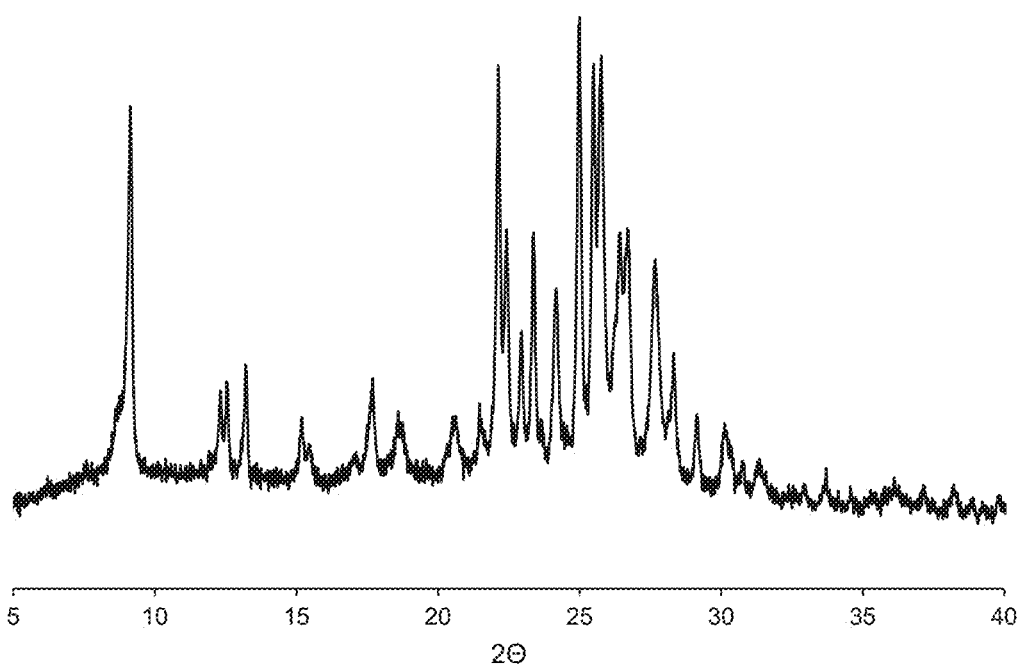
FIG. 18 shows a powder XRD pattern of the as-synthesized zeolite of Example 15.

A powder XRD pattern of the as-synthesized product is shown in FIG. 18 and indicates that the material is a FER framework type zeolite with minor STI.

Example 16

5.53 g of 1 M KOH was mixed with 0.20 g of deionized water and 3.50 g of Nalco alumina-coated silica DVSZN007 (SAR=35; 24.5% solids) and 1.17 g of LUDOX® AS-30. Then, 0.43 g of isobutylamine was added followed by 0.05 g of seeds of zeolite FER.

Figure 19:
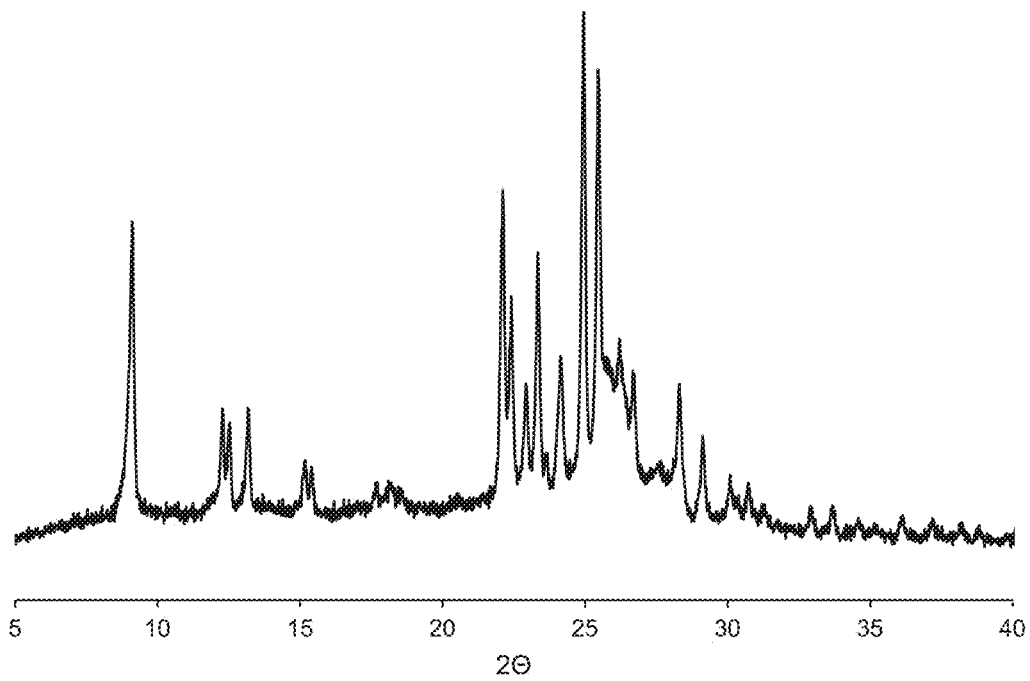
FIG. 19 shows a powder XRD pattern of the as-synthesized zeolite of Example 16.
Figure 20:
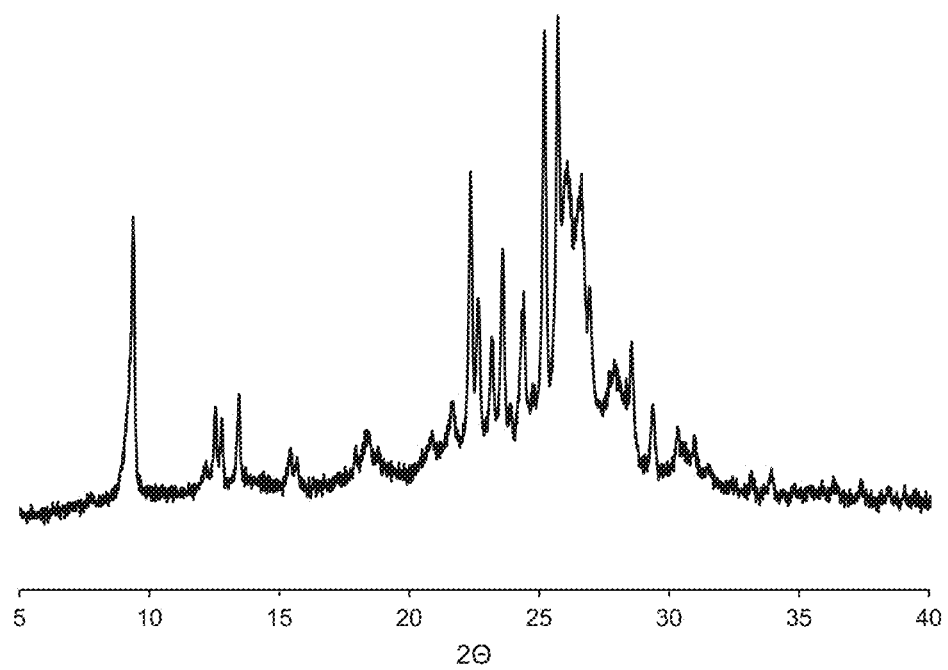
FIG. 20 shows a powder XRD pattern of the as-synthesized zeolite of Example 17.

A powder XRD pattern of the as-synthesized product is shown in FIG. 19 and indicates that the material is a pure phase FER framework type zeolite.

Example 17

6.32 g of 1 M KOH was mixed with 0.61 g of deionized water and 2.00 g of Nalco alumina-coated silica DVSZN007 (SAR=35; 24.5% solids) and 2.93 g of LUDOX® AS-30 colloidal silica. Then, 0.53 g of isobutylamine was added followed by 0.05 g of seeds of zeolite FER.

A powder XRD pattern of the as-synthesized product is shown in FIG. 20 and indicates that the material is a FER framework type zeolite with minor amounts of STI and a layered phase.

Example 18

5.29 g of 1 M NaOH was mixed with 5.13 g of deionized water and then 0.10 g of Reheis F2000 hydrated alumina was added and mixed well. To this 1.13 g of CAB-O-SIL® M-5 fumed silica was added and mixed until homogenous. Then, 0.41 g of isobutylamine was added followed by 0.05 g of seeds of zeolite FER.

Figure 21:
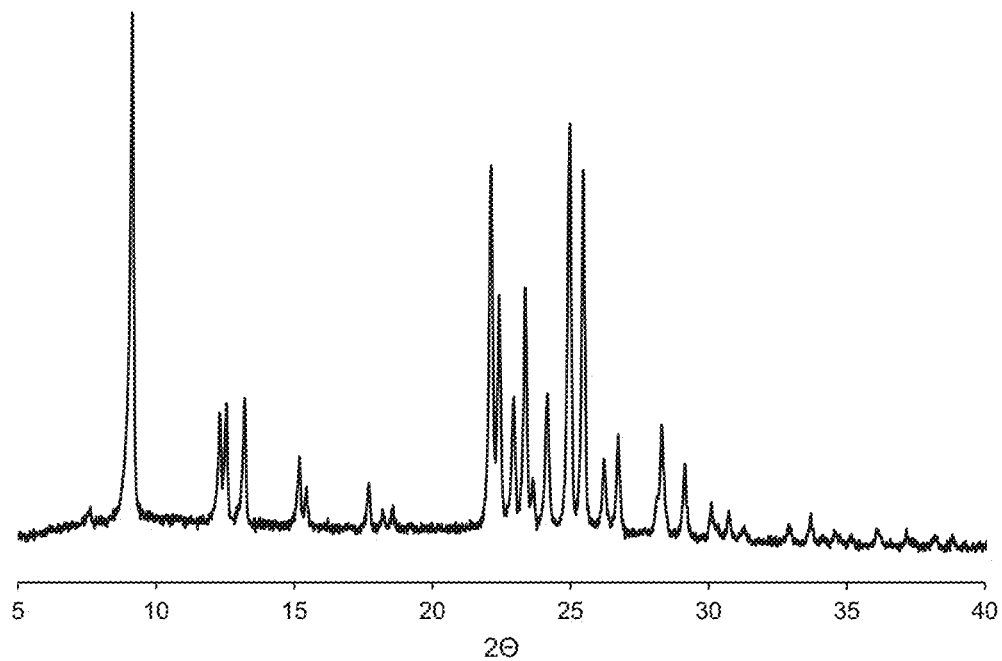
FIG. 21 shows a powder XRD pattern of the as-synthesized zeolite of Example 18.

A powder XRD pattern of the as-synthesized product is shown in FIG. 21 and indicates that the material is a pure phase FER framework type zeolite.

Example 19

5.66 g of 1 M NaOH was mixed with 5.51 g of deionized water and then 0.075 g of Reheis F2000 hydrated alumina was added and mixed well. To this mixture, 1.22 g of CAB-O-SIL® M-5 fumed silica was added and mixed until homogenous. Then 0.44 g of isobutylamine was added followed by 0.05 g of seeds of zeolite FER. Molar ratios are given in Table 2.

Figure 22:
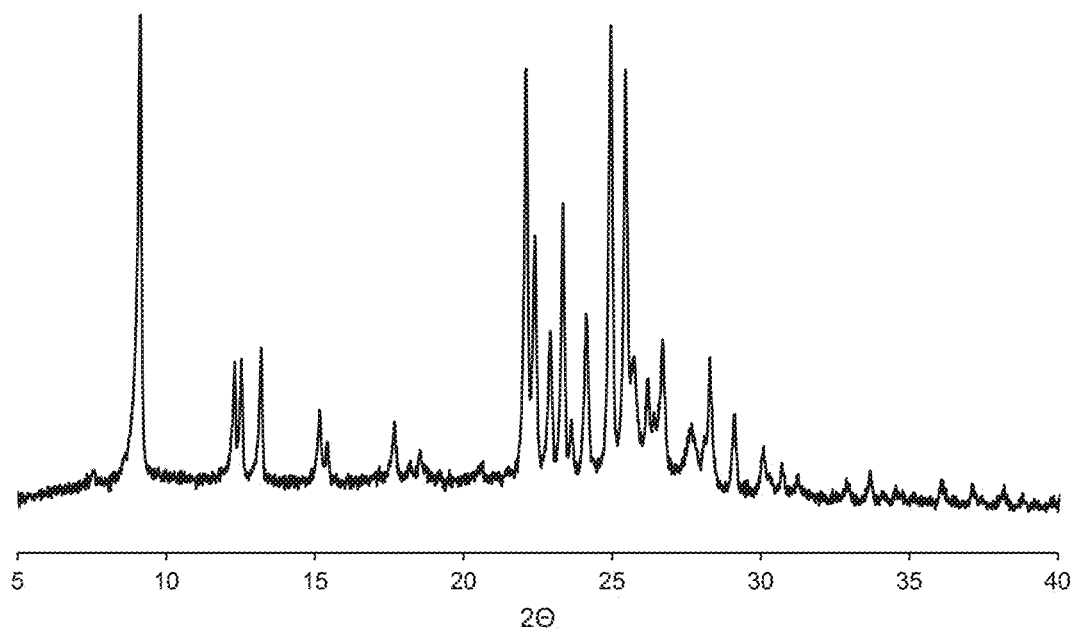
FIG. 22 shows a powder XRD pattern of the as-synthesized zeolite of Example 19.

A powder XRD pattern of the as-synthesized product is shown in FIG. 22 and indicates that the material is a pure phase FER framework type zeolite.

Example 20

5.66 g of 1 M NaOH was mixed with 5.52 g of deionized water and then 0.05 g of Reheis F2000 hydrated alumina was added and mixed well. To this mixture, 1.22 g of CAB-O-SIL® M-5 fumed silica was added and mixed until homogenous. Then, 0.44 g of isobutylamine was added followed by 0.05 g of seeds of zeolite FER.

Figure 23:
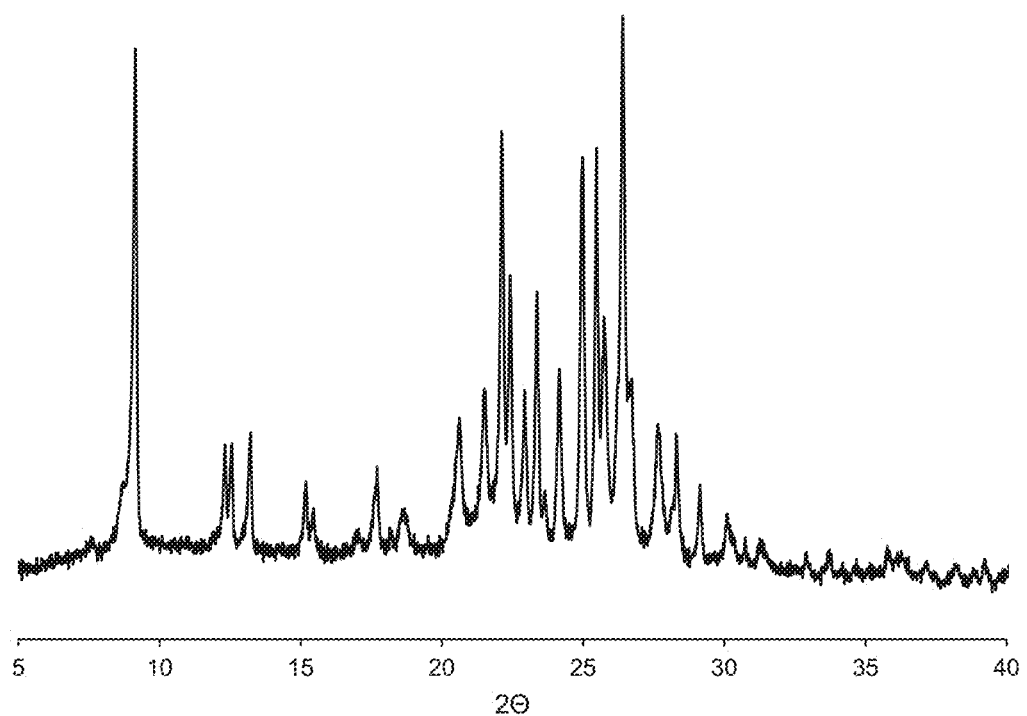
FIG. 23 shows a powder XRD pattern of the as-synthesized zeolite of Example 20.

A powder XRD pattern of the as-synthesized product is shown in FIG. 23 and indicates that the material is a FER framework type zeolite with minor STI.

Example 21

5.28 g of 1 M NaOH was mixed with 5.16 g of deionized water and then 0.035 g of Reheis F2000 hydrated alumina was added and mixed well. To this mixture, 1.13 g of CAB-O-SIL® M-5 fumed silica was added and mixed until homogenous. Then, 0.42 g of isobutylamine was added followed by 0.05 g of seeds of zeolite FER.

Figure 24:
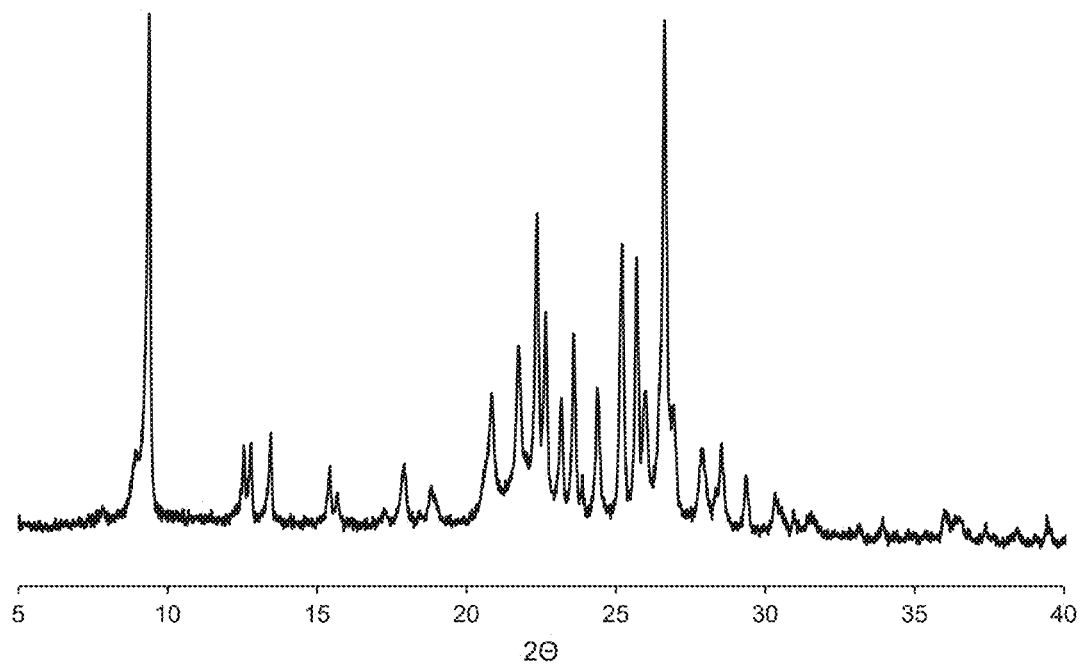
FIG. 24 shows a powder XRD pattern of the as-synthesized zeolite of Example 21.
Figure 25:
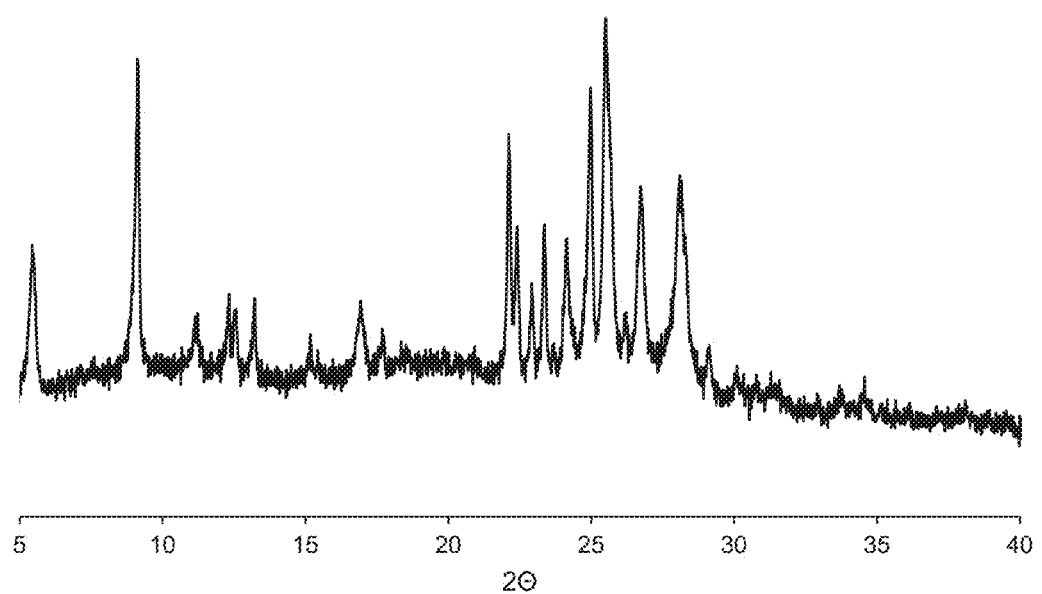
FIG. 25 shows a powder XRD pattern of the as-synthesized zeolite of Example 22.

A powder XRD pattern of the as-synthesized product is shown in FIG. 24 and indicates that the material is a FER framework type zeolite with minor amounts of STI and a layered phase.

Example 22

5.29 g of 1 M NaOH was mixed with 4.00 g of Nalco alumina-coated silica DVSZN007 (SAR=100; 26.5% solids). Then 0.39 g of isobutylamine was added followed by 0.05 g of seeds of zeolite FER.

Figure 26:
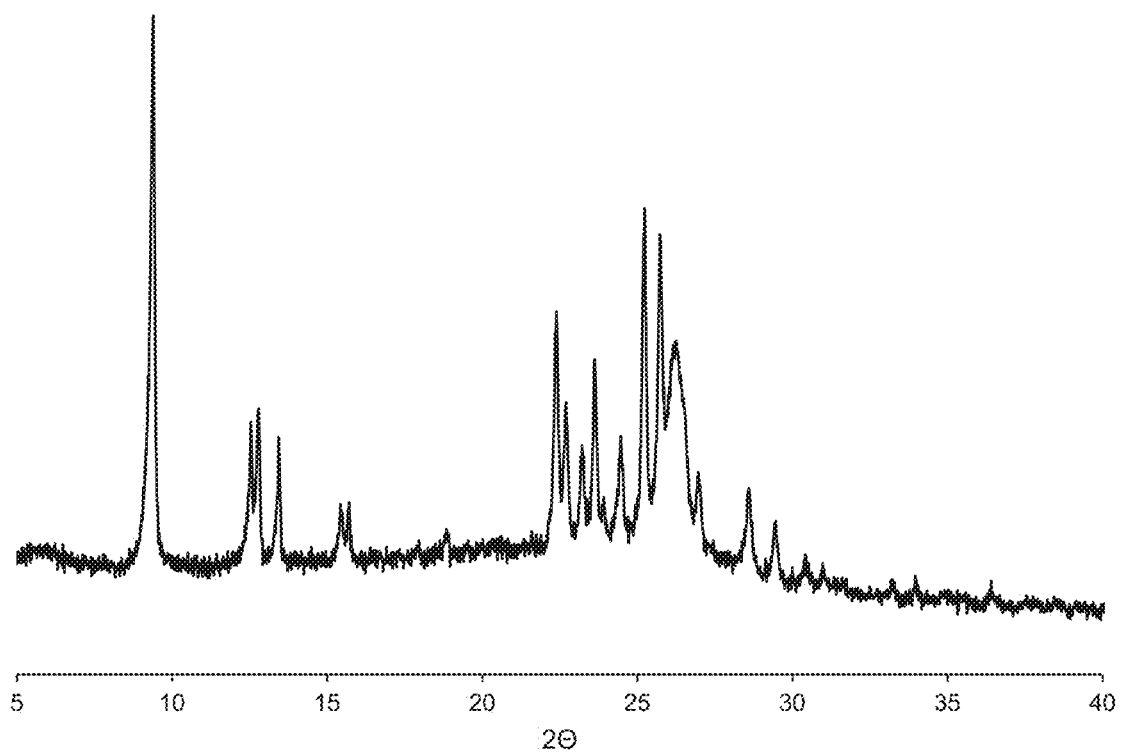
FIG. 26 shows a powder XRD pattern of the ammonium-form zeolite of Example 23.

A powder XRD pattern of the as-synthesized product is shown in FIG. 26 and indicates that the material is a FER framework type zeolite with minor STI.

Example 23

4.94 g of 1 M NaOH was mixed with 0.24 g of DI water and 4.00 g of Nalco alumina-coated silica DVSZN007 (SAR=100; 26.5%). Then, 0.39 g of isobutylamine was added followed by 0.05 g of seeds of zeolite FER.

The recovered as-synthesized material was calcined and then converted to the ammonium form following the method in Example 2.

The acid site density was characterized using n-propylamine TPD and found to be 425 µmol H$^+$/g.

The nitrogen micropore volume was found to be 0.06 cm$^3$/g (t-plot analysis) and the BET surface area was 147 m$^2$/g.

The material had a SiO$_2$/Al$_2$O$_3$ molar ratio (SAR) of 77, as determined by ICP-AES.

Figure 27:
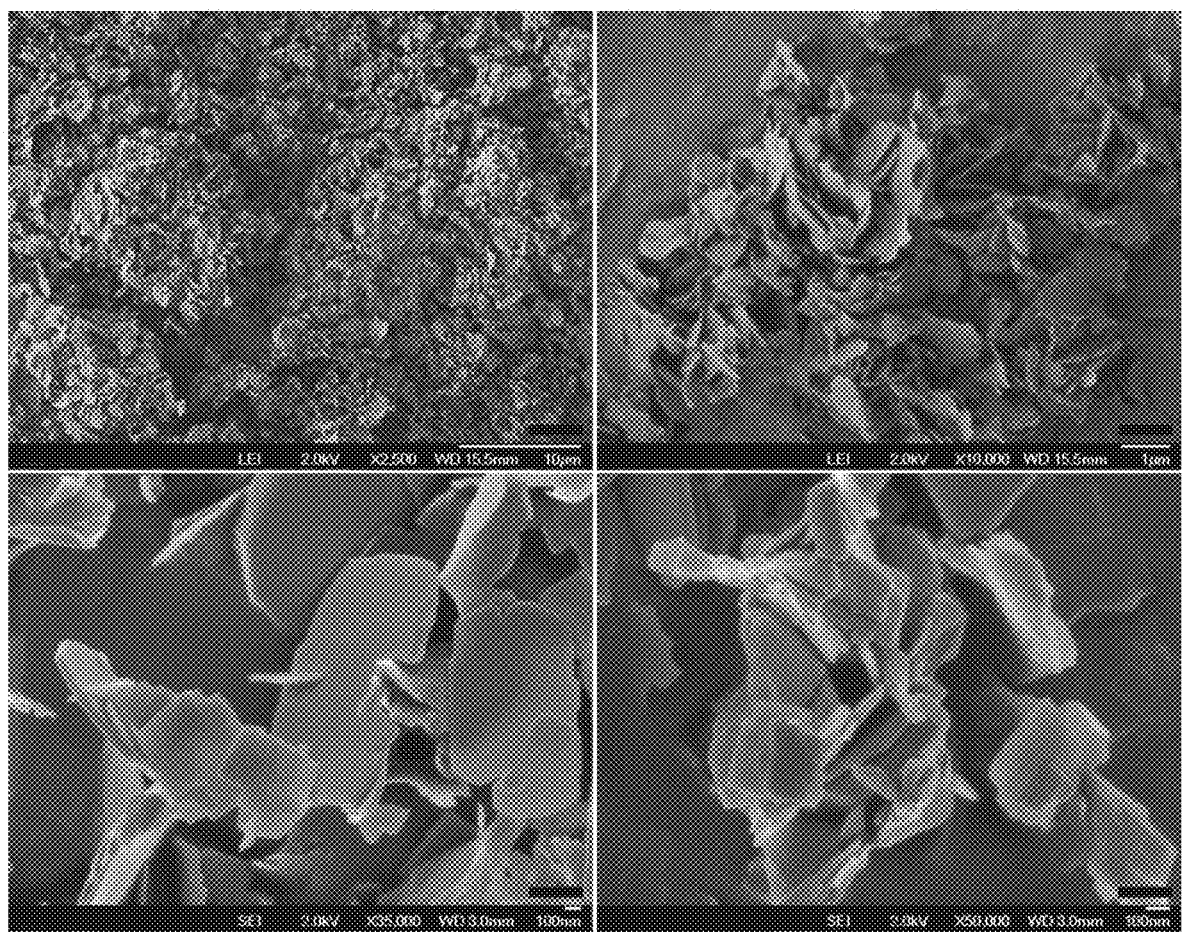
FIG. 27 shows SEM images of the ammonium-form zeolite of Example 23 at various magnifications.

A powder XRD pattern of the ammonium form material is shown in FIG. 26 and indicates that the material is a FER framework type zeolite with a minor amount of an impurity. FIG. 27 shows SEM images of the material at various magnifications.

Example 24

4.41 g of 1 M NaOH was mixed with 0.75 g of deionized water and 4.00 g of Nalco alumina-coated silica DVSZN007 (SAR=100). Then, 0.39 g of isobutylamine was added followed by 0.05 g of seeds of zeolite FER. Molar ratios are given in Table 2.

The recovered as-synthesized material was calcined and then converted to the ammonium form following the method in Example 2.

The acid site density was characterized using n-propylamine TPD and found to be 424 µmol H$^+$/g.

The nitrogen micropore volume was found to be 0.05 cm$^3$/g (t-plot analysis) and the BET surface area was 134 m$^2$/g.

The material had a SiO$_2$/Al$_2$O$_3$ molar ratio (SAR) of 81, as determined by ICP-AES.

Figure 28:
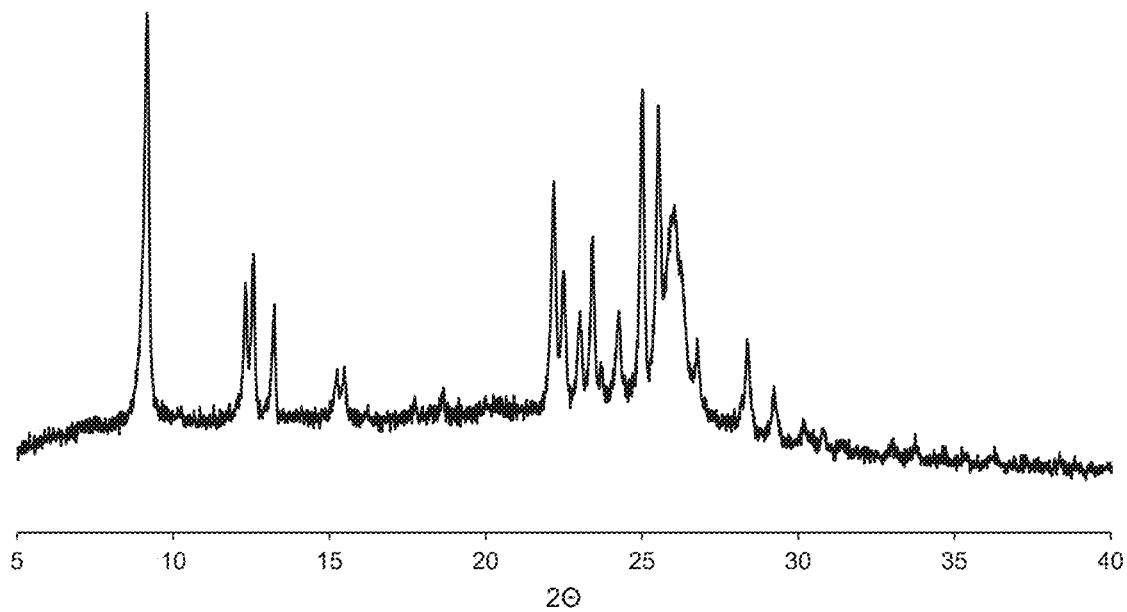
FIG. 28 shows a powder XRD pattern of the ammonium-form zeolite of Example 24.
Figure 29:
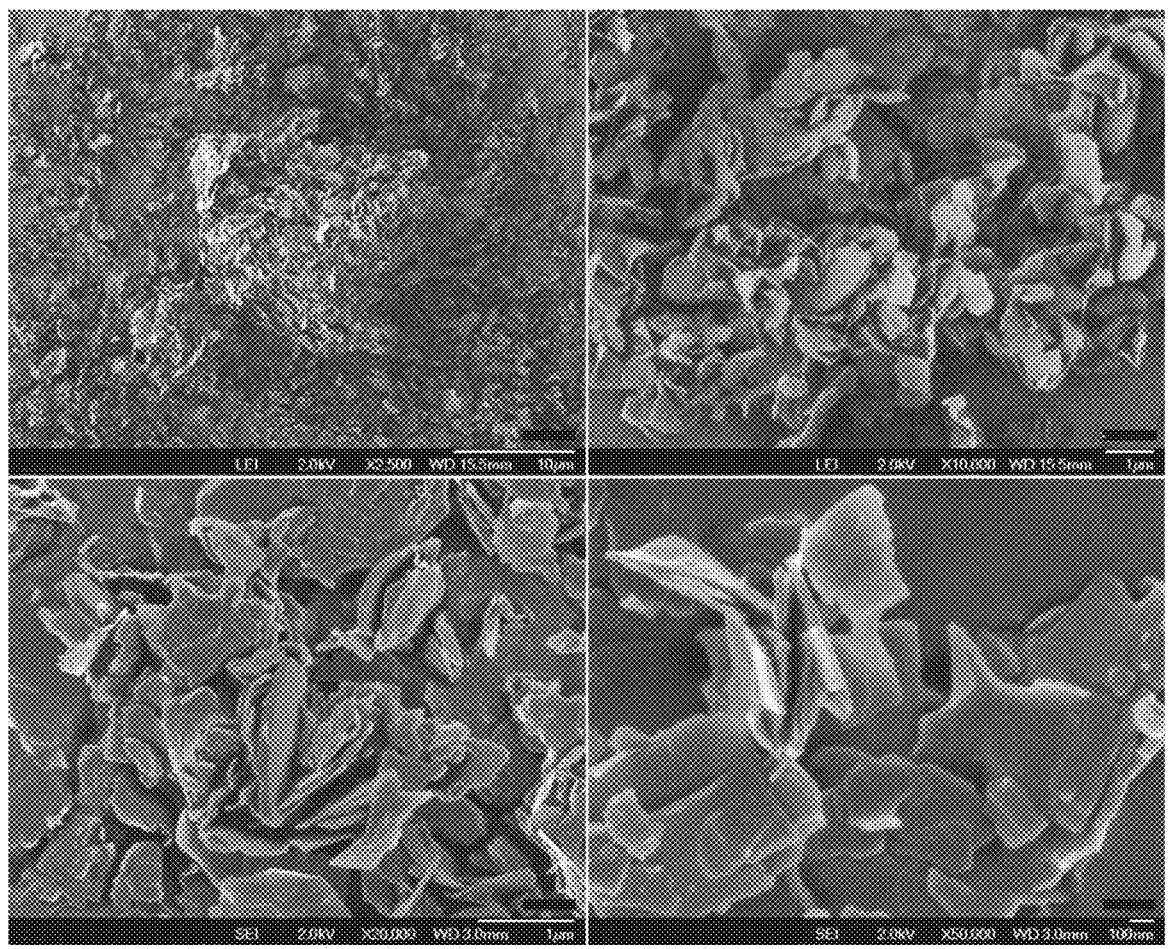
FIG. 29 shows SEM images of the ammonium-form zeolite of Example 24 at various magnifications.

A powder XRD pattern of the ammonium form material is shown in FIG. 28 and indicates that the material is a FER framework type zeolite with a minor impurity. FIG. 29 shows SEM images of the material at various magnifications.

Example 25

3.53 g of 1 M NaOH was mixed with 1.59 g of deionized water and 4.00 g of Nalco alumina-coated silica DVSZN007 (SAR=100; 26.5% solids). Then, 0.39 g of isobutylamine was added followed by 0.05 g of seeds of zeolite FER.

Figure 30:
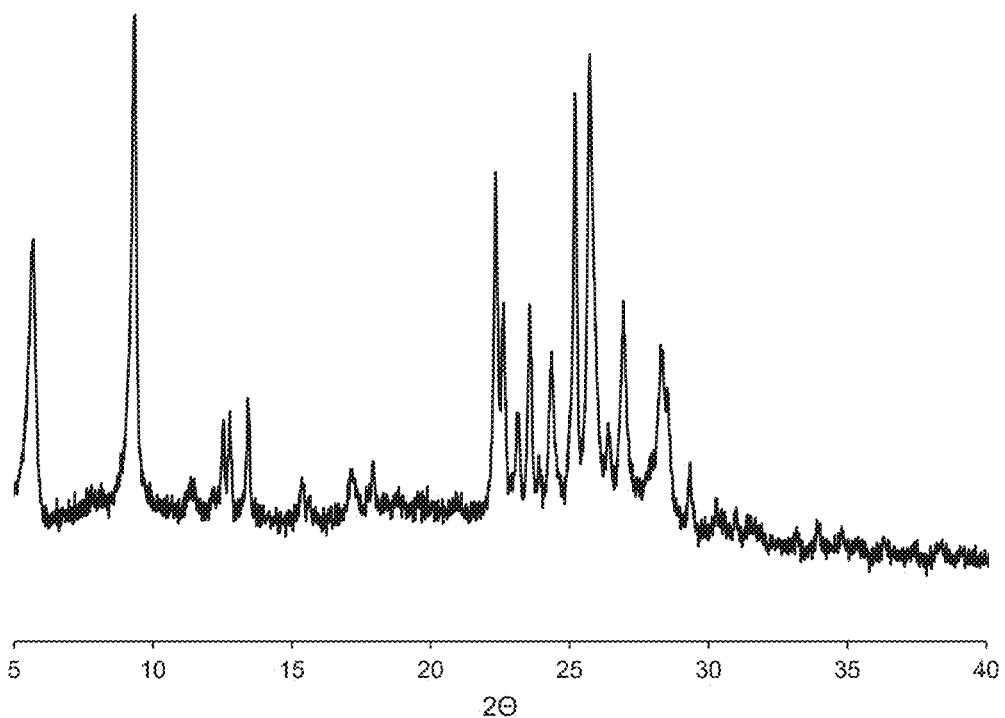
FIG. 30 shows a powder XRD pattern of the as-synthesized zeolite of Example 25.

A powder XRD pattern of the as-synthesized product is shown in FIG. 30 and indicates that the material is a FER framework type zeolite with minor amounts of STI and a layered phase.

Example 26

4.42 g of 1 M NaOH was mixed with 4.00 g of Nalco alumina-coated silica DVSZN007 (SAR=35; 24.5% solids). Then, 0.28 g of n-propylamine was added followed by 0.05 g of seeds of zeolite FER.

Figure 31:
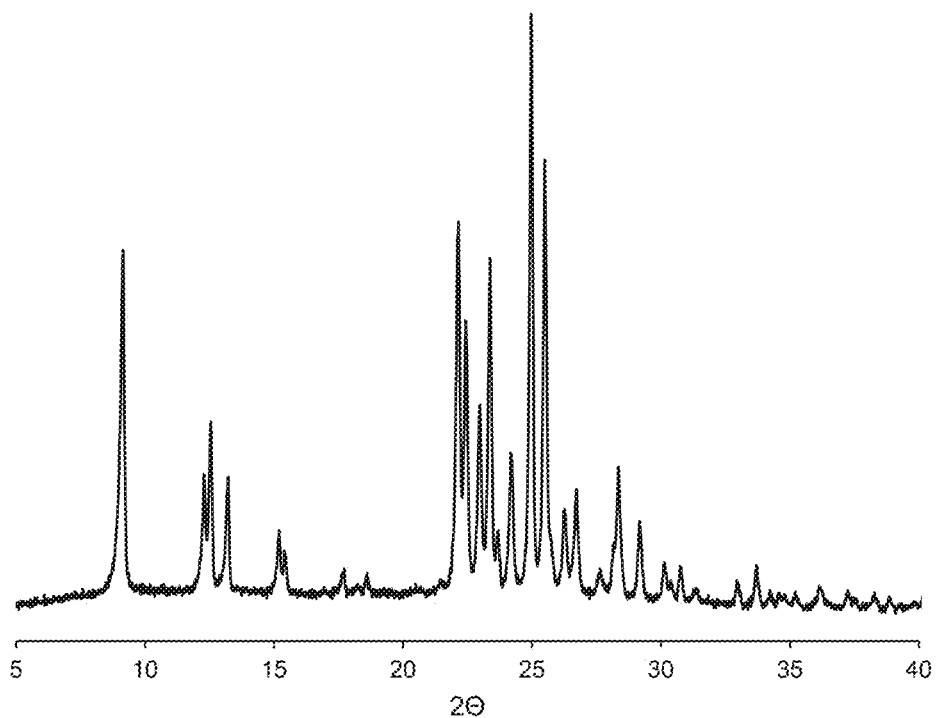
FIG. 31 shows a powder XRD pattern of the as-synthesized zeolite of Example 26.

A powder XRD pattern of the as-synthesized product is shown in FIG. 31 and indicates that the material is a pure phase FER framework type zeolite.

Example 27

4.42 g of 1 M NaOH was mixed with 4.00 g of Nalco alumina-coated silica DVSZN007 (SAR=35; 24.5% solids). Then, 0.48 g of dipropylamine was added followed by 0.05 g of seeds of zeolite FER.

Figure 32:
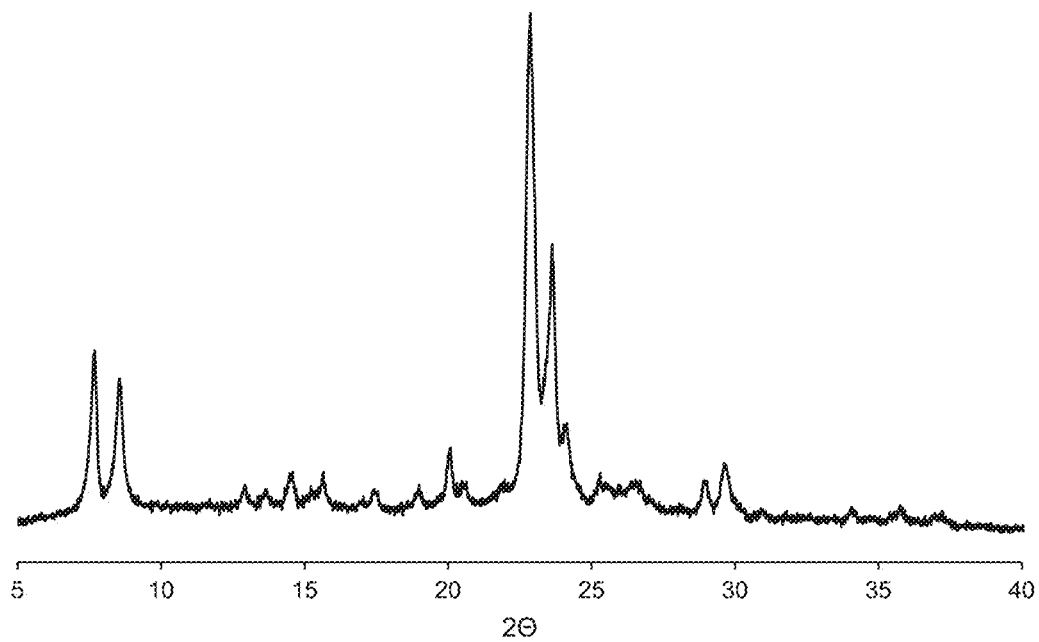
FIG. 32 shows a powder XRD pattern of the as-synthesized zeolite of Example 27.

A powder XRD pattern of the as-synthesized product is shown in FIG. 32 and indicates that the material is an MFI framework type zeolite.

Example 28

4.42 g of 1 M NaOH was mixed with 4.00 g of Nalco alumina-coated silica DVSZN007 (SAR=35; 24.5% solids). Then, 0.35 g of n-butylamine was added followed by 0.05 g of seeds of zeolite FER.

Figure 33:
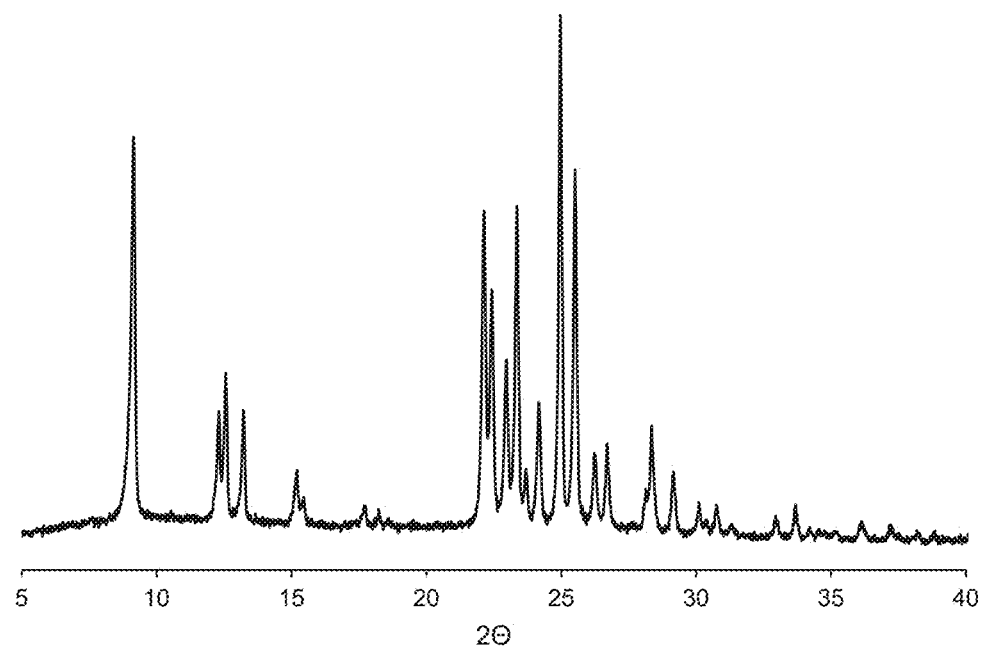
FIG. 33 shows a powder XRD pattern of the as-synthesized zeolite of Example 28.

A powder XRD pattern of the as-synthesized product is shown in FIG. 33 and indicates that the material is a pure phase FER framework type zeolite.

Example 29

4.42 g of 1 M NaOH was mixed with 4.00 g of Nalco alumina-coated silica DVSZN007 (SAR=35; 24.5% solids). Then, 0.41 g of n-amylamine was added followed by 0.05 g of seeds of zeolite FER.

Figure 34:
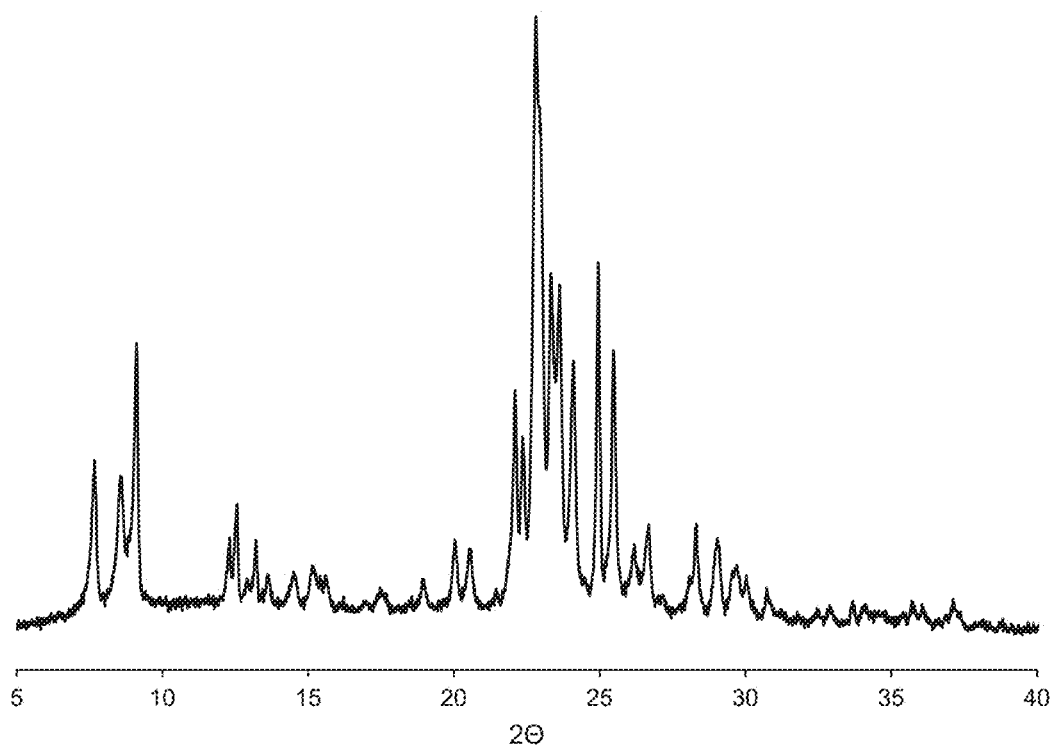
FIG. 34 shows a powder XRD pattern of the as-synthesized zeolite of Example 29.

A powder XRD pattern of the as-synthesized product is shown in FIG. 34 and indicates that the material is a mixture of FER and MFI framework type zeolites.

TABLE 3

| Ex. | Q | Gel SAR | M Cation | Si and Al Source[a] | Q/$SiO_2$ | M/$SiO_2$ | $H_2O$/$SiO_2$ | Temp. [°] | Time [h] | Product | Acidity [mmol/g] | Product SAR |
|---|---|---|---|---|---|---|---|---|---|---|---|---|
| 1 | isobutylamine | 35 | Na | Nalco(35) | 0.3 | 0.28 | 33.8 | 170 | 2 | FER | | |
| 2 | isobutylamine | 35 | Na | Nalco(35) | 0.3 | 0.28 | 25 | 170 | 2 | FER | 423 | 29.9 |
| 3 | isobutylamine | 35 | K | Nalco(35) | 0.3 | 0.28 | 33.8 | 170 | 3 | FER | | |
| 4 | isobutylamine | 39.5 | Na | Nalco(35) + Ludox | 0.3 | 0.28 | 33.8 | 170 | 3 | FER | | |
| 5 | isobutylamine | 42.8 | Na | Nalco(35) + Ludox | 0.3 | 0.28 | 33.8 | 170 | 3 | FER | | |
| 6 | isobutylamine | 50 | Na | Nalco(35) + Ludox | 0.3 | 0.28 | 33.8 | 170 | 3 | FER | | |
| 7 | isobutylamine | 50 | Na | Nalco(35) + Ludox | 0.3 | 0.28 | 25 | 170 | 2 | FER | 421 | 40.7 |
| 8 | isobutylamine | 75 | Na | Nalco(35) + Ludox | 0.3 | 0.28 | 33.8 | 170 | 3 | FER | 400 | 57.1 |
| 9 | isobutylamine | 100 | Na | Nalco(35) + Ludox | 0.3 | 0.28 | 33.8 | 170 | 3 | FER + STI | | |
| 10 | isobutylamine | 150 | Na | Nalco(35) + Ludox | 0.3 | 0.28 | 33.8 | 170 | 3 | FER + STI | | |
| 11 | isobutylamine | 100 | Na | Nalco(100) | 0.3 | 0.28 | 33.8 | 170 | 3 | FER + STI + layered | | |
| 12 | isobutylamine | 125 | Na | Nalco(100) + Ludox | 0.3 | 0.28 | 33.8 | 170 | 3 | FER + STI + layered | | |
| 13 | isobutylamine | 150 | Na | Nalco(100) + Ludox | 0.3 | 0.28 | 33.8 | 170 | 3 | FER + STI | | |
| 14 | isobutylamine | 200 | Na | Nalco(100) + Ludox | 0.3 | 0.28 | 33.8 | 170 | 3 | FER + STI + layered | | |
| 15 | isobutylamine | 100 | Na | Nalco(35) + Ludox | 0.3 | 0.28 | 25 | 170 | 2 | FER + STI | | |
| 16 | isobutylamine | 50 | K | Nalco(35) + Ludox | 0.3 | 0.28 | 25 | 170 | 3 | FER | | |
| 17 | isobutylamine | 100 | K | Nalco(35) + Ludox | 0.3 | 0.28 | 25 | 170 | 3 | FER + STI + layered | | |
| 18 | isobutylamine | 35 | Na | Cabosil + Reheis | 0.3 | 0.28 | 30 | 170 | 2 | FER | | |
| 19 | isobutylamine | 50 | Na | Cabosil + Reheis | 0.3 | 0.28 | 30 | 170 | 2 | FER | | |
| 20 | isobutylamine | 75 | Na | Cabosil + Reheis | 0.3 | 0.28 | 30 | 170 | 3 | FER + STI | | |
| 21 | isobutylamine | 100 | Na | Cabosil + Reheis | 0.3 | 0.28 | 30 | 170 | 3 | FER + STI + layered | | |
| 22 | isobutylamine | 100 | Na | Nalco(100) | 0.3 | 0.30 | 25 | 150 | 3 | FER + layered | | |
| 23 | isobutylamine | 100 | Na | Nalco(100) | 0.3 | 0.28 | 25 | 150 | 3 | FER + layered | 425 | 77.2 |
| 24 | isobutylamine | 100 | Na | Nalco(100) | 0.3 | 0.25 | 25 | 150 | 3 | FER + layered | 424 | 80.9 |
| 25 | isobutylamine | 100 | Na | Nalco(100) | 0.3 | 0.20 | 25 | 150 | 3 | FER + layered | | |
| 26 | n-propylamine | 35 | Na | Nalco(35) | 0.3 | 0.28 | 25 | 170 | 3 | FER | | |
| 27 | dipropylamine | 35 | Na | Nalco(35) | 0.3 | 0.28 | 25 | 170 | 3 | MFI | | |
| 28 | n-butylamine | 35 | Na | Nalco(35) | 0.3 | 0.28 | 25 | 170 | 3 | FER | | |
| 29 | n-butylamine | 35 | Na | Nalco(35) | 0.3 | 0.28 | 25 | 170 | 3 | FER + MFI | | |

[a]"Nalco(35)" = Nalco alumina-coated silica (SAR = 35); "Nalco(100)" = Nalco alumina-coated silica (SAR = 100); "Ludox" = LUDOX® AS-30 colloidal silica;"Cabosil" = CAB-O-SIL® M-5 fumed silica; and "Reheis" = Reheis F2000 hydrated alumina.

The invention claimed is:

1. A method of synthesizing a zeolite of FER framework type, the method comprising:
   (1) forming a reaction mixture comprising:
      (a) a source of silicon;
      (b) a source of aluminum;
      (c) a structure directing agent (Q) comprising n-propylamine, n-butylamine, isobutylamine, n-amylamine, or a combination thereof;
      (d) a source of an alkali metal (M);
      (e) a source of hydroxide ions;
      (f) water; and
      (g) seeds; and
   (2) subjecting the reaction mixture to crystallization conditions sufficient to form crystals of the zeolite;
   wherein the reaction mixture comprises an alumina-coated silica as a combined source of silicon and aluminum.

2. The method of claim 1, wherein the reaction mixture has a composition, in terms of molar ratios, as follows:

| | |
|---|---|
| $SiO_2$/$Al_2O_3$ | 30 to 200 |
| Q/$SiO_2$ | 0.05 to 0.50 |
| M/$SiO_2$ | 0.10 to 1.00 |
| OH/$SiO_2$ | 0.10 to 1.00 |
| $H_2O$/$SiO_2$ | 10 to 60. |

3. The method of claim 1, wherein the reaction mixture has a composition, in terms of molar ratios, as follows:

| | |
|---|---|
| $SiO_2$/$Al_2O_3$ | 30 to 150 |
| Q/$SiO_2$ | 0.10 to 0.40 |
| M/$SiO_2$ | 0.15 to 0.50 |

-continued

| | |
|---|---|
| OH/$SiO_2$ | 0.15 to 0.50 |
| $H_2O$/$SiO_2$ | 15 to 50. |

4. The method of claim 1, wherein the alkali metal is sodium, potassium, or a combination thereof.

5. The method of claim 1, wherein the seeds comprise a FER framework type zeolite.

6. The method of claim 1, wherein the reaction mixture comprises from 0.01 ppm by weight to 10,000 ppm by weight of seeds.

7. The method of claim 1, wherein the crystallization conditions include heating the reaction at a temperature of from 125° C. to 200° C. under autogenous pressure for a time of from 24 hours to 240 hours.

8. A zeolite of FER framework type and, in its as-synthesized form, comprising one or more of isobutylamine and n-amylamine in its pores.

9. The zeolite of claim 8, having a molar ratio of $SiO_2/Al_2O_3$ in a range of from 20 to 100.

10. The zeolite of claim 8, having a molar ratio of $SiO_2/Al_2O_3$ in a range of from 25 to 85.

11. The zeolite of claim 8, having a Brønsted acid site density in a range of from 350 μmol $H^+$/g to 500 μmol $H^+$/g.

* * * * *